US012684390B2

(12) United States Patent
Lyazidi et al.

(10) Patent No.: US 12,684,390 B2
(45) Date of Patent: Jul. 14, 2026

(54) METHODS FOR POSITIONING REFERENCE SIGNAL (PRS) ACTIVITY REPORTING

(71) Applicant: Telefonaktiebolaget LM Ericsson (publ), Stockholm (SE)

(72) Inventors: Yazid Lyazidi, Hässelby (SE); Florent Munier, Västra Frölunda (SE); Ritesh Shreevastav, Upplands Väsby (SE); Siva Muruganathan, Stittsville (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 487 days.

(21) Appl. No.: 18/253,478

(22) PCT Filed: Nov. 10, 2021

(86) PCT No.: PCT/SE2021/051125
§ 371 (c)(1),
(2) Date: May 18, 2023

(87) PCT Pub. No.: WO2022/131988
PCT Pub. Date: Jun. 23, 2022

(65) Prior Publication Data
US 2023/0413096 A1 Dec. 21, 2023

Related U.S. Application Data

(60) Provisional application No. 63/126,021, filed on Dec. 16, 2020.

(51) Int. Cl.
*H04W 24/10* (2009.01)
*H04L 5/00* (2006.01)
*H04W 64/00* (2009.01)

(52) U.S. Cl.
CPC .......... *H04W 24/10* (2013.01); *H04L 5/0051* (2013.01); *H04W 64/00* (2013.01)

(58) Field of Classification Search
CPC ...... H04L 5/0051; H04W 24/10; H04W 64/00
See application file for complete search history.

(56) References Cited

U.S. PATENT DOCUMENTS

2019/0037338 A1 1/2019 Edge et al.
2020/0107286 A1 4/2020 Akkarakaran et al.
(Continued)

FOREIGN PATENT DOCUMENTS

WO 2020026211 A1 2/2020
WO 2020146739 A1 7/2020
(Continued)

OTHER PUBLICATIONS

"3GPP TR 38.857 V1.1.0", 3rd Generation Partnership Project; Technical Specification Group Radio Access Network; Study on NR Positioning Enhancements; (Release 17), Mar. 2021, pp. 1-149.
(Continued)

*Primary Examiner* — Natasha W Cosme
(74) *Attorney, Agent, or Firm* — Murphy, Bilak & Homiller, PLLC

(57) ABSTRACT

Embodiments include methods for a positioning node associated with a radio access network (RAN). Such methods include receiving, from a plurality of user equipment (UEs), measurements made by the respective UEs on positioning reference signals (PRS) transmitted by a plurality of transmission reception points (TRPs) in the RAN. Such methods also include sending, to one or more RAN nodes, respective PRS activity reports that include information about measurements made by the UEs on PRS transmitted by TRPs associated with the respective RAN nodes. Other embodiments include complementary methods for RAN nodes and UEs, as well as positioning nodes, RAN nodes, and UEs configured to perform such methods.

19 Claims, 8 Drawing Sheets

(56) References Cited

U.S. PATENT DOCUMENTS

| | | | |
|---|---|---|---|
| 2020/0154240 A1 | 5/2020 | Edge et al. | |
| 2020/0267508 A1* | 8/2020 | Fischer | G01S 5/02 |
| 2020/0267684 A1 | 8/2020 | Huang et al. | |
| 2021/0051559 A1 | 2/2021 | Edge et al. | |
| 2021/0105867 A1 | 4/2021 | Akkarakaran et al. | |
| 2021/0297216 A1 | 9/2021 | Shreevastav et al. | |
| 2021/0306895 A1* | 9/2021 | Chen | G01S 5/0236 |
| 2022/0116089 A1 | 4/2022 | Khoryaev et al. | |
| 2022/0132493 A1* | 4/2022 | Fakoorian | G01S 5/0236 |
| 2023/0189201 A1 | 6/2023 | Lu et al. | |
| 2023/0224848 A1 | 7/2023 | Dong | |

FOREIGN PATENT DOCUMENTS

| | | |
|---|---|---|
| WO | 2020164609 A1 | 8/2020 |
| WO | 2020206021 A1 | 10/2020 |
| WO | 2021006796 A1 | 1/2021 |

OTHER PUBLICATIONS

"Revised WID on NR Positioning Enhancements", 3GPP TSG RAN Meeting #91e, RP-210628, Electronic Meeting, Revised from RP-202900, Mar. 16-26, 2022, pp. 1-7.

"3GPP TS 38.473 V16.4.0", 3rd Generation Partnership Project; Technical Specification Group Radio Access Network; NG-RAN; F1 application protocol (F1AP) (Release 16), Jan. 2021, pp. 1-461.

"3rd Generation Partnership Project; Technical Specification Group Radio Access Network; LTE Positioning Protocol (LPP) (Release 16)", 3GPP TS 37.355 V. 16.4.0, Mar. 2021, pp. 1-130.

"Discussion on Enhancements for Latency Reduction", 3GPP RAN WG2 Meeting #114-e, R2-2105302, Electronic, May 19-27, 2021, pp. 1-4.

"Discussion on on-demand DL-PRS", 3GPP TSG-RAN WG2 Meeting #114 electronic, R2-2105338, Online, May 2021, pp. 1-4.

"On-Demand DL-PRS", 3GPP TSG-RAN WG2 Meeting #114-e, R2-2106084, Electronic, May 19-27, 2021, pp. 1-10.

"Running 38.305 CR for Positioning WI on RAT dependent positioning methods", 3GPP TSG-RAN2 Meeting #116bis-e, R2-2201815, Online, Jan. 17-25, 2022, pp. .1-73.

"3GPP TS 38.455 V16.3.0", 3rd Generation Partnership Project; Technical Specification Group Radio Access Network; NG-RAN; NR Positioning Protocol A (NRPPa) (Release 16), Apr. 2021, pp. 1-151.

"3GPP TS 38.455 V16.2.0", 3rd Generation Partnership Project; Technical Specification Group Radio Access Network; NG-RAN; NR Positioning Protocol A (NRPPa) (Release 16), Jan. 2021, pp. 1-151.

"3GPP TS 38.455 V16.4.0", 3rd Generation Partnership Project; Technical Specification Group Radio Access Network; NG-RAN; NR Positioning Protocol A (NRPPa) (Release 16), Jul. 2021, pp. 1-151.

"3GPP TS 38.473 version 16.3.1", ETSI TS 138 473 V16.3.1, 5G; NG-RAN; F1 Application Protocol (F1AP) (Release 16), Nov. 2020, pp. 1-459.

"Discussion on first aspects to support On-Demand PRS transmission", 3GPP TSG-RAN3 Meeting # 112-e, R3-212351, May 17-28, 2021, pp. 1-5.

"Discussion on potential enhancements for NR positioning", 3GPP TSG RAN WG1 #102-e, R1-2006376, e-Meeting, Aug. 17-28, 2020, pp. 1-8.

"Introduction of NR Positioning enhancements to F1AP", 3GPP TSG-RAN WG3 Meeting,#112-e, R3-212780, E-meeting, May 17-28, 2021, pp. 1-219.

"Introduction of NR Positioning enhancements to NRPPa", 3GPP TSG-RAN WG3 Meeting #113-e, R3-213164, Online, Aug. 16-26, 2021, pp. 1-60.

"Introduction of NR Positioning enhancements to NRPPa", 3GPP TSG-RAN WG3 Meeting #112-, R3-212779, Online, May 17-28, 2021, pp. 1-60.

"Support of F1AP NR Positioning enhancements", 3GPP TSG-RAN WG3 Meeting #112-e, R3-212353, Online, May 17-28, 2021, pp. 1-15.

"Support of NRPPa NR Positioning enhancements", 3GPP TSG-RAN WG3 Meeting #112-e, R3-212352, Online, May 17-28, 2021, pp. 1-14.

"Views on potential positioning enhancements", 3GPP TSG RAN WG1 #103-e, R1-2008301, Oct. 16, 2020, pp. 1-13.

"3GPP TS 33.501 V16.5.0", 3rd Generation Partnership Project; Technical Specification Group Services and System Aspects; Security architecture and procedures for 5G system (Release 16), Dec. 2020, pp. 1-253.

"3GPP TS 37.355 V16.2.0", 3rd Generation Partnership Project; Technical Specification Group Radio Access Network; LTE Positioning Protocol (LPP) (Release 16), Sep. 2020, pp. 1-296.

"3GPP TS 38.305 V16.2.0", 3rd Generation Partnership Project; Technical Specification Group Radio Access Network; NG Radio Access Network (NG-RAN); Stage 2 functional specification of User Equipment (UE) positioning in NG-RAN (Release 16), Sep. 2020, pp. 1-117.

"3GPP TS 38.331 V16.2.0", 3rd Generation Partnership Project; Technical Specification Group Radio Access Network; NR; Radio Resource Control (RRC) protocol specification (Release 16), Sep. 2020, pp. 1-921.

"3GPP TS 23.501 V16.6.0", 3rd Generation Partnership Project; Technical Specification Group Services and System Aspects; System architecture for the 5G System (5GS); Stage 2 (Release 16), Sep. 2020, pp. 1-447.

"Summary on agenda item 8.11.4 on on-demand PRS", 3GPP TSG-RAN WG2 Meeting #114, R2-2106467, Electronic Meeting, May 19-27, 2021, pp. 1-11.

"Discussion on procedures for On-demand PRS for DL-based positioning", 3GPP RAN WG2 Meeting #114-e, R2-2105305, Electronic, May 19-27, 2021, pp. 1-6.

* cited by examiner

FIG. 13

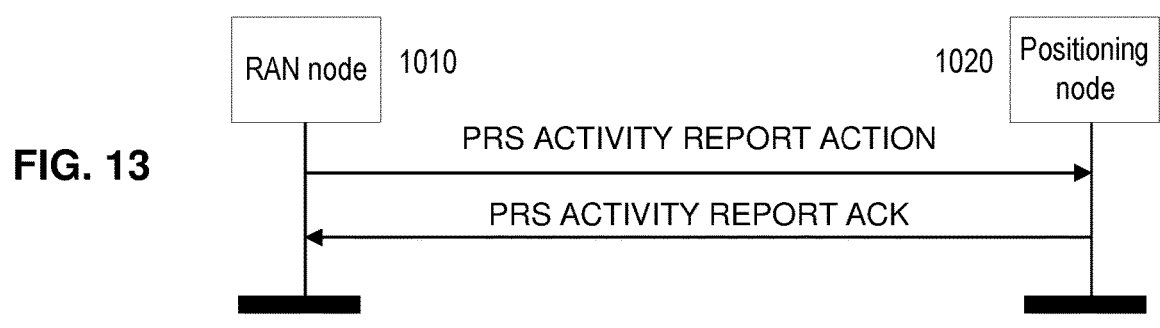

Receiving, from one or more RAN nodes, respective requests for PRS activity reporting. — 1410

Receiving, from a plurality of UEs, measurements made by the respective UEs on PRS transmitted by a plurality of transmission reception points (TRPs) in the RAN. — 1420

Receiving, from the plurality of UEs, updated measurements made by the UEs on PRS transmitted by the plurality of TRPs. — 1430

Sending, to the RAN nodes, respective PRS activity reports that include information about measurements made by the UEs on PRS transmitted by TRPs associated with the respective RAN nodes. — 1440

Sending periodic PRS activity reports to each of the RAN nodes. — 1441

Stopping the sending after a particular number of periodic PRS activity reports is sent to each of the RAN nodes. — 1442

Receiving, from the RAN nodes, respective acknowledgements of the respective PRS activity reports. — 1450

Receiving, from the RAN nodes, respective action reports indicating updated PRS transmission configurations for TRPs associated with the respective RAN nodes — 1460

Determining positioning assistance data based on the respective action reports received from the RAN nodes, wherein the positioning assistance data includes indications of active PRS associated with each of the TRPs. — 1470

Broadcasting, via the RAN nodes, the positioning assistance data in at least one cell of the RAN. — 1480

FIG. 14

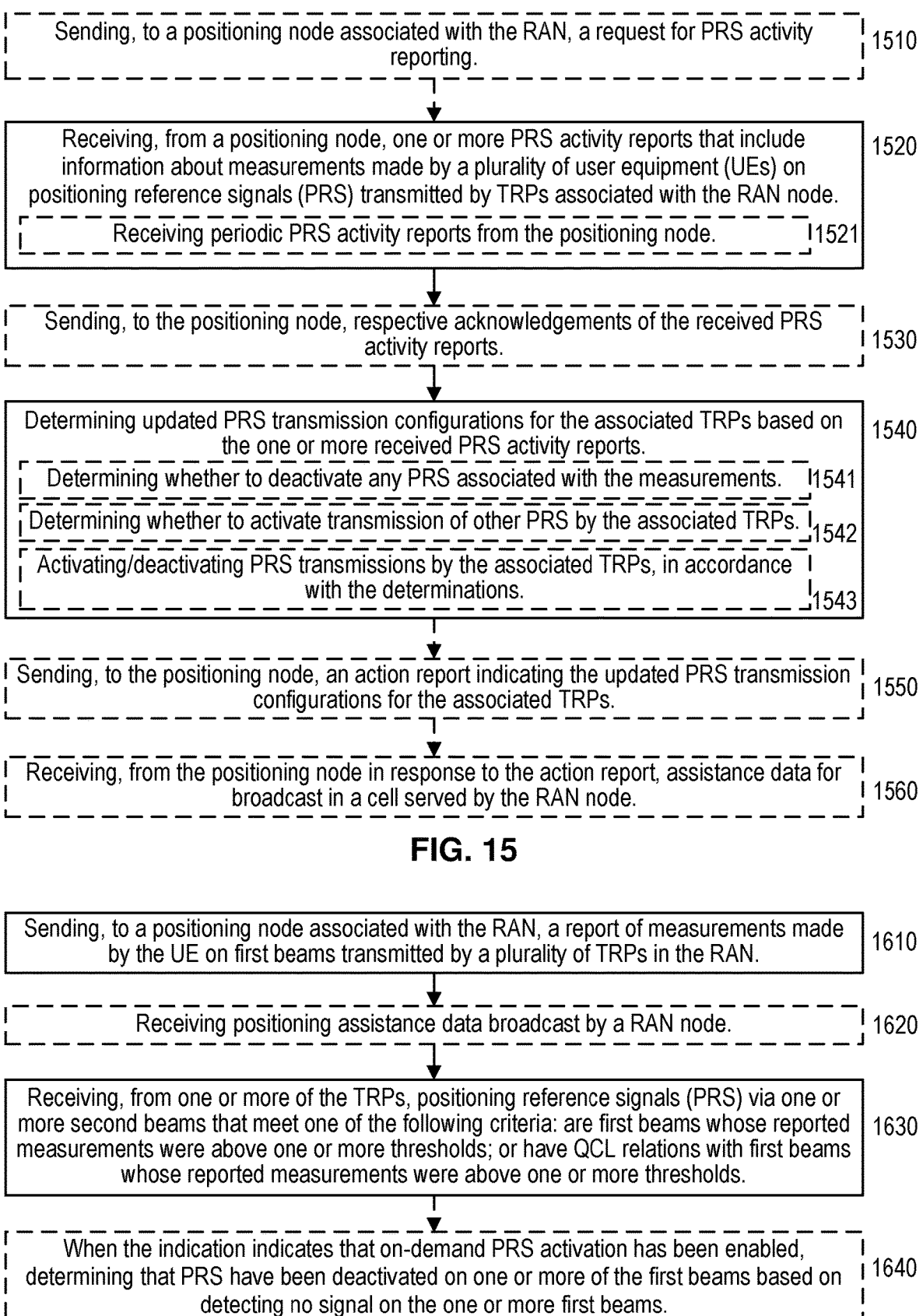

Sending, to a positioning node associated with the RAN, a request for PRS activity reporting. 1510

Receiving, from a positioning node, one or more PRS activity reports that include information about measurements made by a plurality of user equipment (UEs) on positioning reference signals (PRS) transmitted by TRPs associated with the RAN node. 1520

Receiving periodic PRS activity reports from the positioning node. 1521

Sending, to the positioning node, respective acknowledgements of the received PRS activity reports. 1530

Determining updated PRS transmission configurations for the associated TRPs based on the one or more received PRS activity reports. 1540

Determining whether to deactivate any PRS associated with the measurements. 1541

Determining whether to activate transmission of other PRS by the associated TRPs. 1542

Activating/deactivating PRS transmissions by the associated TRPs, in accordance with the determinations. 1543

Sending, to the positioning node, an action report indicating the updated PRS transmission configurations for the associated TRPs. 1550

Receiving, from the positioning node in response to the action report, assistance data for broadcast in a cell served by the RAN node. 1560

FIG. 15

Sending, to a positioning node associated with the RAN, a report of measurements made by the UE on first beams transmitted by a plurality of TRPs in the RAN. 1610

Receiving positioning assistance data broadcast by a RAN node. 1620

Receiving, from one or more of the TRPs, positioning reference signals (PRS) via one or more second beams that meet one of the following criteria: are first beams whose reported measurements were above one or more thresholds; or have QCL relations with first beams whose reported measurements were above one or more thresholds. 1630

When the indication indicates that on-demand PRS activation has been enabled, determining that PRS have been deactivated on one or more of the first beams based on detecting no signal on the one or more first beams. 1640

FIG. 16

METHODS FOR POSITIONING REFERENCE SIGNAL (PRS) ACTIVITY REPORTING

TECHNICAL FIELD

The present disclosure relates generally to wireless networks, and more specifically to wireless network transmission of positioning reference signals (PRS) that can be used to determine the geographic location of a user equipment (UE).

BACKGROUND

Long-Term Evolution (LTE) is an umbrella term for fourth generation (4G) radio access technologies (RATs) developed within 3GPP and initially standardized in Releases 8 and 9, also known as Evolved UTRAN (E-UTRAN). LTE is available in various frequency bands and is accompanied by improvements to non-radio aspects referred to as System Architecture Evolution (SAE), including the Evolved Packet Core (EPC) network. LTE continues to evolve through subsequent releases.

An overall exemplary architecture of a network comprising LTE and SAE is shown in FIG. 1. E-UTRAN 100 includes one or more evolved Node B's (eNB), such as eNBs 105, 110, and 115, and one or more user equipment (UE), such as UE 120. As used within the 3GPP standards, "user equipment" or "UE" means any wireless communication device (e.g, smartphone or computing device) that is capable of communicating with 3GPP-standard-compliant network equipment, including E-UTRAN as well as UTRAN and/or GERAN, as the third-generation ("3G") and second-generation ("2G") 3GPP RANs are commonly known.

As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. Each of the eNBs can serve a geographic coverage area including one more cells, including cells 106, 111, and 115 served by eNBs 105, 110, and 115, respectively.

The eNBs in the E-UTRAN communicate with each other via the X2 interface, as shown in FIG. 1. The eNBs also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1. In general, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The S-GW handles all Internet Protocol (IP) data packets (e.g., data or user plane) between the UE and the EPC and serves as the local mobility anchor for the data bearers when the UE moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations. HSS 131 can also communicate with MMEs 134 and 138 via respective S6a interfaces.

In some embodiments, HSS 131 can communicate with a user data repository (UDR)—labelled EPC-UDR 135 in FIG. 1—via a Ud interface. EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

FIG. 2 illustrates a block diagram of an exemplary control plane (CP) protocol stack between a UE, an eNB, and an MME. The exemplary protocol stack includes Physical (PHY), Medium Access Control (MAC), Radio Link Control (RLC), Packet Data Convergence Protocol (PDCP), and Radio Resource Control (RRC) layers between the UE and eNB. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PDCP layer provides ciphering/deciphering and integrity protection for both CP and user plane (UP), as well as other UP functions such as header compression. The exemplary protocol stack also includes non-access stratum (NAS) signaling between the UE and the MME.

The RRC layer controls communications between a UE and an eNB at the radio interface, as well as the mobility of a UE between cells in the E-UTRAN. After a UE is powered ON it will be in the RRC_IDLE state until an RRC connection is established with the network, at which time the UE will transition to RRC_CONNECTED state (e.g., where data transfer can occur). The UE returns to RRC_IDLE after the connection with the network is released. In RRC_IDLE state, the UE does not belong to any cell, no RRC context has been established for the UE (e.g., in E-UTRAN), and the UE is out of UL synchronization with the network. Even so, a UE in RRC_IDLE state is known in the EPC and has an assigned IP address.

Furthermore, in RRC_IDLE state, the UE's radio is active on a discontinuous reception (DRX) schedule configured by upper layers. During DRX active periods (also referred to as "DRX On durations"), an RRC_IDLE UE receives system information (SI) broadcast by a serving cell, performs measurements of neighbor cells to support cell reselection, and monitors a paging channel for pages from the EPC via an eNB serving the cell in which the UE is camping.

A UE must perform a random-access (RA) procedure to move from RRC_IDLE to RRC_CONNECTED state. In RRC_CONNECTED state, the cell serving the UE is known and an RRC context is established for the UE in the serving eNB, such that the UE and eNB can communicate. For example, a Cell Radio Network Temporary Identifier (C-RNTI)—a UE identity used for signaling between UE and network—is configured for a UE in RRC_CONNECTED state.

The fifth generation ("5G") of cellular systems, also referred to as New Radio (NR), was initially standardized by 3GPP in Rel-15. NR is developed for maximum flexibility to support multiple and substantially different use cases. These include enhanced mobile broadband (eMBB), machine type communications (MTC), ultra-reliable low latency communications (URLLC), side-link device-to-device (D2D), and several other use cases. NR is being further developed through subsequent 3GPP releases.

5G/NR technology shares many similarities with LTE. For example, NR uses CP-OFDM (Cyclic Prefix Orthogonal Frequency Division Multiplexing) in the DL and both CP-OFDM and DFT-spread OFDM (DFT-S-OFDM) in the UL. As another example, in the time domain, NR DL and UL physical resources are organized into equal-sized 1-ms subframes. A subframe is further divided into multiple slots of equal duration, with each slot including multiple OFDM-based symbols. In addition to RRC_IDLE and RRC_CON-NECTED states, the NR RRC layer also includes an RRC_I-NACTIVE state with similar properties as a "suspended" condition standardized in LTE Rel-13.

3GPP standards provide various ways for positioning (e.g., determining the position of, locating, and/or determining the location of) UEs operating in 3GPP networks. In general, a positioning node configures the target device (e.g., UE) and/or a RAN node to perform one or more positioning measurements according to one or more positioning methods. For example, the positioning measurements can include timing (and/or timing difference) measurements on UE, network, and/or satellite transmissions. The positioning measurements are used by the target device, the RAN node, and/or the positioning node to determine the location of the target device.

Positioning is also expected to be important for NR, which may include additional UE positioning use cases, scenarios, and/or applications beyond those for LTE. NR Rel-16 positioning was developed based on network-transmitted positioning reference signals (PRS), which can provide added value in terms of enhanced location capabilities. For example, PRS transmission in low and high frequency bands (i.e., below and above 6 GHz) and use of massive antenna arrays provide additional degrees of freedom to substantially improve positioning accuracy.

SUMMARY

Further enhancements are planned for NR Rel-17, including "on-demand PRS" whereby the UE can request the network to transmit PRS in a configuration that facilitates UE positioning measurements and (optionally) position determination. However, there are various problems, issues, and/or difficulties with on-demand PRS that need to be addressed for successful standardization and deployment in wireless networks.

Embodiments of the present disclosure provide specific improvements to communication between user equipment (UE) and network nodes in a wireless communication network, such as by facilitating solutions to overcome the exemplary problems summarized above and described in more detail below.

Some embodiments of the present disclosure include methods (e.g., procedures) for a positioning node associated with a radio access network (RAN). These exemplary methods can be performed by a positioning node or function (e.g., E-SMLC, SLP, LMF, etc., or component thereof).

These exemplary methods can include receiving, from a plurality of UEs, measurements made by the respective UEs on PRS transmitted by a plurality of transmission reception points (TRPs) in the RAN. These exemplary methods can also include sending, to one or more RAN nodes, respective PRS activity reports that include information about measurements made by the UEs on PRS transmitted by TRPs associated with the respective RAN nodes.

In some embodiments, these exemplary methods can also include receiving, from the RAN nodes, respective acknowledgements of the respective PRS activity reports.

In some embodiments, these exemplary methods can also include receiving, from the plurality of UEs, updated measurements made by the UEs on PRS transmitted by the plurality of TRPs. In such embodiments, the sending operations can include sending periodic PRS activity reports to each of the one or more RAN nodes. Each periodic PRS activity report can be based on updated measurements received by the positioning node before sending the particular periodic PRS activity report. In some embodiments, sending the periodic PRS activity reports can be responsive to one of the following: a single request from each of the RAN nodes for PRS activity reports; or a configuration received from an operations/administration/maintenance (OAM) function associated with the RAN.

In some embodiments, the sending operations can include stopping the sending after a particular number of periodic PRS activity reports is sent to each of the RAN nodes. The particular number can be based on a predetermined or configured number or on a period of the periodic PRS activity reports and a predetermined or configured reporting duration.

In some embodiments, these exemplary method can also include receiving, from the RAN nodes, respective action reports indicating updated PRS transmission configurations for TRPs associated with the respective RAN nodes. In some of these embodiments, each of the updated PRS transmission configurations indicates one or more PRS that has been activated or deactivated responsive to a PRS activity report from the positioning node.

In some of these embodiments, these exemplary methods can also include determining positioning assistance data based on the respective action reports received from the RAN nodes and broadcasting, via the one or more RAN nodes, the positioning assistance data in at least one cell of the RAN. The positioning assistance data can include indications of active PRS associated with each of the TRPs. In some embodiments, the positioning assistance data broadcast in each cell can include an indication that the RAN node serving the cell is capable of on-demand (e.g., dynamic) activation of PRS in the cell.

In some embodiments, each PRS activity report includes a list of PRS resource sets that can be configured by the RAN node or TRPs associated with the RAN node.

In some of these embodiments, each PRS activity report can also include the following associated with each particular one of the PRS resource sets in the list:

identifiers of PRS resources within the particular PRS resource set; and one or more of the following associated with each particular one of the PRS resources:
a number of UEs that have reported reference signal receive power (RSRP) above a threshold for the particular PRS resource,
average reported RSRP for the particular PRS resource,
average reported reference signal received quality (RSRQ) for the particular PRS resource, and
any quasi-colocation (QCL) relationships for the particular PRS resource.

In other of these embodiments, each PRS activity report can also include the following associated with each particular one of the PRS resource sets in the list:
a number of UEs that have reported reference signal receive power (RSRP) above a threshold for the particular PRS resource set, average reported RSRP for the particular PRS resource set, average reported reference signal received quality (RSRQ) for the particular PRS resource set, and any quasi-colocation (QCL) relationships for the particular PRS resource set.

Other embodiments of the present disclosure include methods (e.g., procedures) for a RAN node associated with one or more TRPs. These exemplary method can be performed by a RAN node (e.g., base station, eNB, gNB, ng-eNB, etc. or component thereof).

These exemplary methods can include receiving, from a positioning node associated with the RAN, one or more PRS activity reports that include information about measurements made by a plurality of UEs on PRS transmitted by TRPs associated with the RAN node. These exemplary methods can also include determining updated PRS transmission configurations for the associated TRPs based on the one or more received PRS activity reports.

In some embodiments, these exemplary method can also include sending, to the positioning node, respective acknowledgements of the received PRS activity reports.

In some embodiments, the receiving operations can include receiving periodic PRS activity reports from the positioning node. Each periodic PRS activity report can be based on updated UE measurements received by the positioning node before sending the periodic PRS activity report. In some embodiments, receiving the periodic PRS activity reports can be responsive to one of the following: a single request from the RAN node for PRS activity reports; or a configuration by an OAM function associated with the RAN. In some embodiments, only a particular number of periodic PRS activity reports are received, with the particular number being based on one of the following: a predetermined or configured number; or a period of the periodic PRS activity reports and a predetermined or configured reporting duration.

In some embodiments, these exemplary methods can also include sending, to the positioning node, an action report indicating the updated PRS transmission configurations for the associated TRPs. In such embodiments, each of the updated PRS transmission configurations indicates one or more PRS that has been activated or deactivated responsive to a PRS activity report from the positioning node.

In some of these embodiments, the determining operations can include determining whether to deactivate any of the PRS associated with the measurements (e.g., indicated in the PRS activity report(s)); determining whether to activate transmission of other PRS by the associated TRPs; and activating or deactivating PRS transmissions in accordance with the determinations.

In some of these embodiments, these exemplary methods can also include receiving, from the positioning node in response to the action report, assistance data for broadcast in a cell served by the RAN node. The positioning assistance data can include indications of active PRS transmissions by one or more of the TRPs associated with the RAN node.

In various embodiments, the contents of the received PRS activity reports can be the same as those described above in relation to positioning node embodiments.

Other embodiments include methods (e.g., procedures) for a UE configured for positioning in a RAN. These exemplary method can be performed by a UE (e.g., wireless device).

These exemplary methods can include sending, to a positioning node associated with the RAN, a report of measurements made by the UE on first beams transmitted by a plurality of TRPs in the RAN. These exemplary methods can also include receiving, from one or more of the TRPs, PRS via one or more second beams that meet one of the following criteria:

are first beams whose reported measurements were above one or more thresholds; or have QCL relations with first beams whose reported measurements were above one or more thresholds.

In some embodiments, these exemplary methods can also include receiving positioning assistance data broadcast by a RAN node. In such case, receiving the PRS via the one or more second beams is based on the received positioning assistance data. In some of these embodiments, the positioning assistance data includes one or more of the following:

indications of active PRS associated with each of the TRPs, wherein the active PRS includes the PRS received via the second beams; and an indication of whether on-demand PRS activation has been enabled or disabled by the RAN node.

In some variants, these exemplary methods can also include, when the indication indicates that on-demand PRS activation has been enabled, determining that PRS have been deactivated on one or more of the first beams based on detecting no signal on the one or more first beams.

In some embodiments, each measurement in the report is associated with a particular PRS resource within a particular PRS resource set transmitted by a particular one of the TRPs. Also, each measurement in the report is of one of the following parameters: RSRP for the particular PRS resource, or RSRQ for the particular PRS resource.

Other embodiments include positioning nodes or functions (e.g., E-SMLCs, SLPs, LMFs, etc., or components thereof), RAN nodes (e.g., base stations, eNBs, gNBs, ng-eNBs, etc. or components thereof), and UEs (e.g., wireless devices, etc.) configured to perform operations corresponding to any of the exemplary methods described herein. Other embodiments include non-transitory, computer-readable media storing program instructions that, when executed by processing circuitry, configure such positioning nodes or RAN nodes to perform operations corresponding to various exemplary methods described herein.

These and other embodiments described herein can reduce signaling overhead by aggregating PRS measurements by multiple UEs into a single report to a particular RAN node. Furthermore, such techniques can be transparent to UEs and do not impact UE implementation or require standardization of new UE procedures (e.g., in RRC). As such, legacy UEs can also benefit. In addition, such techniques reduce PRS transmission overhead, energy consumption, and interference, since PRS activity reports include information that enables RAN nodes to selectively transmit PRS beams only to coverage areas with UEs needing such beams and to turn off PRS beams in other coverage areas. More generally, embodiments described herein provide various benefits and/or advantages that improve location-based services.

These and other objects, features, and advantages of embodiments of the present disclosure will become apparent upon reading the following Detailed Description in view of the Drawings briefly described below.

BRIEF DESCRIPTION OF THE DRAWINGS

FIGS. 10-13 show signal flow diagrams of various PRS activity reporting procedures, according to various embodiments of the present disclosure.

FIG. 14 shows a flow diagram of an exemplary method for a positioning node (e.g., E-SMLC, LMF, SLP, etc.), according to various embodiments of the present disclosure.

FIG. 15 shows a flow diagram of an exemplary method for a RAN node (e.g., base station, eNB, gNB, ng-eNB, etc.), according to various embodiments of the present disclosure.

FIG. 16 shows a flow diagram of an exemplary method for a UE (e.g., wireless device), according to various embodiments of the present disclosure.

DETAILED DESCRIPTION

Figure 1:
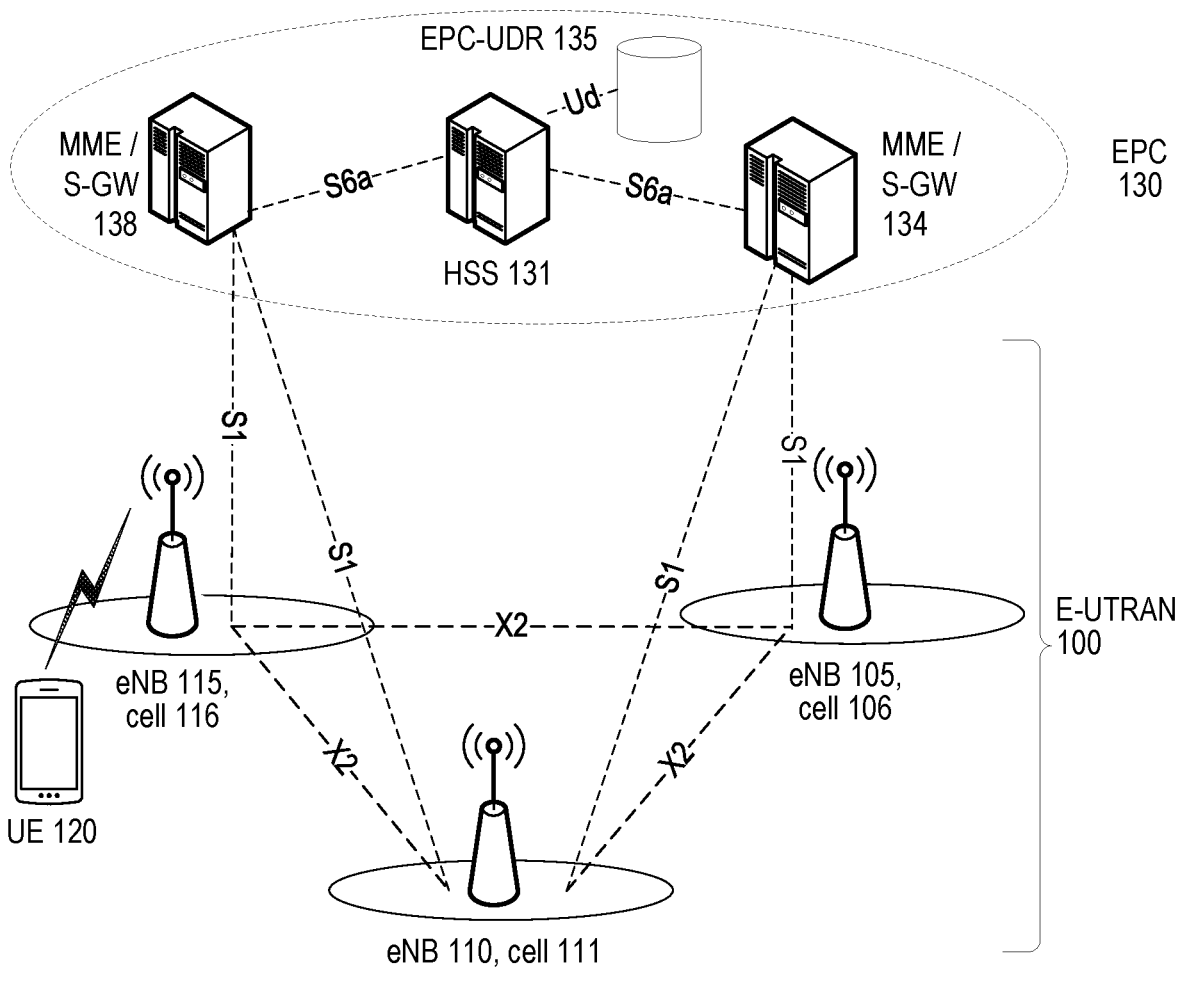
FIG. 1 shows a high-level view of an exemplary LTE network architecture.
Figure 2:
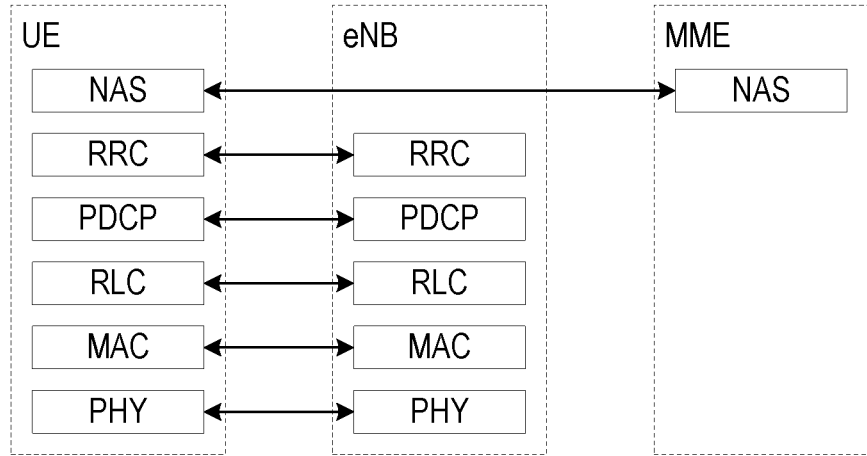
FIG. 2 shows exemplary LTE control plane (CP) protocol layers.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objectives, features and advantages of the enclosed embodiments will be apparent from the following description.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission point (TP), transmission/reception point (TRP), transmission nodes, Remote Radio Unit (RRU), Remote Radio Head (RRH), core network node (e.g., MME, SGW), core network function (e.g., AMF, LMF, etc.), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. A network node may also comprise test equipment.

The term "radio network node" can refer to any type of "network node" a radio access network (RAN) that operates to wirelessly transmit and/or receive signals. Radio network nodes can include any type of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU), Remote Radio Head (RRH), an integrated access backhaul (IAB) node, a transmission point (TP), and a transmission/reception point (TRP). In addition, a location measurement unit (LMU), or equivalent positioning measurement node and/or functionality, is a type of radio network node.

In some embodiments, a TRP may be associated with a network node or radio network node. In some embodiments, a multi-TRP scenario may include more than one TRPs associated with one or more network nodes.

Unless otherwise noted, the terms "wireless device" (or "WD" for short) and "user equipment" (or "UE" for short) are used interchangeably. A WD can be any type of wireless device capable of communicating with a network node or another WD over radio signals, such as wireless device (WD). The WD may also be a radio communication device, target device, device to device (D2D) WD, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), USB dongles, mobile-type communication (MTC) devices, Internet-of-Things (IoT) devices, vehicle-mounted wireless terminal devices, ProSe UE, V2V UE, V2X UE, etc.

The term "radio node" (or simply "node") used herein may be used to also denote a wireless device (WD) such as a wireless device (WD) or a radio network node.

Unless otherwise noted, functions described herein as being performed by a UE, network node, radio network node, etc. can be distributed over a plurality of devices and/or network nodes. In other words, it is contemplated that the functions of the network node and UE described herein are not limited to performance by a single physical device and, in fact, can be distributed among several physical devices.

Unless otherwise noted, the term "channel" can refer to a logical, transport, or physical channel. A channel may comprise and/or be arranged on one or more carriers, e.g., a plurality of subcarriers. A channel carrying and/or for carrying control signaling/control information may be considered a control channel, in particular if it is a physical layer channel and/or if it carries control plane information. Analogously, a channel carrying—and/or for carrying—data signaling/user information may be considered a data channel (e.g., PDSCH), in particular if it is a physical layer channel and/or if it carries user plane (UP) information. A channel may be defined for a specific communication direction, or for two complementary communication directions (e.g., UL and DL, or sidelink in two directions), in which case it may be considered to have two component channels, one for each direction.

Although terminology from particular wireless systems (e.g., LTE and/or NR) may be used herein, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Figures 3, 4:
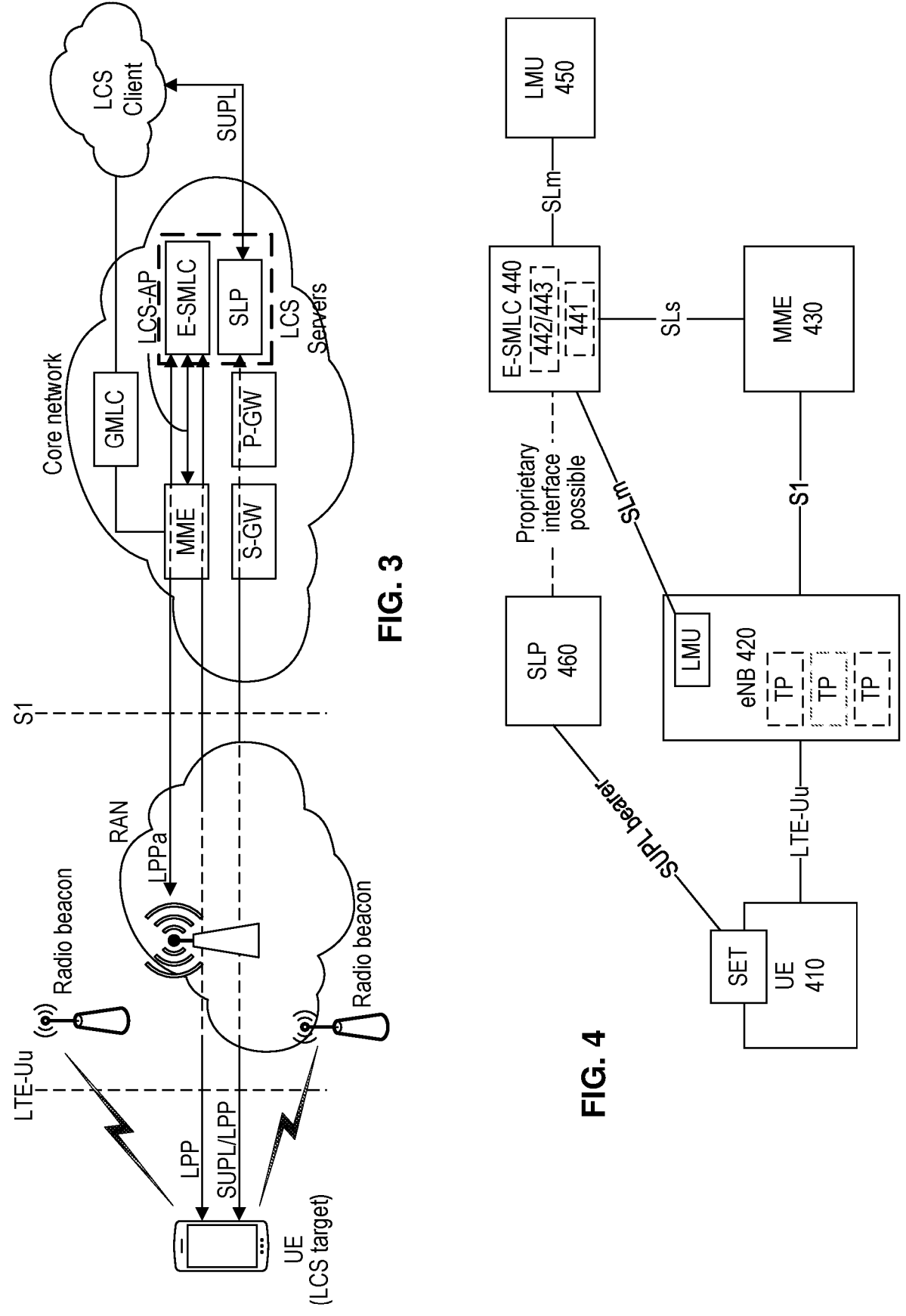
FIGS. 3-4 show two views of an exemplary positioning architecture for an LTE network.

FIG. 3 shows an exemplary positioning architecture for an LTE network. Functional elements of the LTE positioning architecture include LCS Client, LCS target and LCS Server. The LCS Server is a physical or logical entity (e.g., as embodied by the E-SMLC or SLP in FIG. 3) managing positioning for an LCS target (e.g., as embodiments by the UE in FIG. 3) by collecting measurements and other location information, assisting the terminal in measurements when necessary, and estimating the LCS target location. An LCS Client is a software and/or hardware entity that interacts with an LCS Server to obtain location information for one or more LCS targets (i.e., the entities being positioned) such as the UE in FIG. 3. LCS Clients may also reside in the LCS targets themselves. An LCS Client sends a request to an LCS Server to obtain location information, and the LCS Server processes and serves the received requests and sends the positioning result and optionally a velocity estimate to the LCS Client. A positioning request can be originated from the terminal or a network node or external client.

In the LTE architecture shown in FIG. 3, position calculation can be conducted, for example, by the LCS Server (e.g., E-SMLC or SLP) or by the LCS target (e.g., a UE). The former approach corresponds to UE-assisted positioning when it is based on UE measurements, whilst the latter corresponds to UE-based positioning. The following positioning methods are supported in LTE:

Enhanced Cell ID (E-CID). Utilizes information to associate the UE with the geographical area of a serving cell, and then additional information to determine a finer granularity position. The following measurements are supported for E-CID: AoA (base station only), UE Rx-Tx time difference, timing advance (TA) types 1 and 2, reference signal received power (RSRP), and reference signal received quality (RSRQ).

Assisted GNSS. GNSS information retrieved by the UE, supported by assistance information provided to the UE from the E-SMLC.

OTDOA (Observed Time Difference of Arrival). The UE receives and measures Global Navigation Satellite System (GNSS) signals, supported by assistance information provided to the UE from E-SMLC.

UTDOA (Uplink TDOA). The UE is requested to transmit a specific waveform that is detected by multiple location measurement units (LMUs, which may be standalone, co-located or integrated into an eNB) at known positions. These measurements are forwarded to the E-SMLC for multilateration.

In addition, one or more of the following positioning modes can be utilized in each of the positioning methods listed above:

UE-Assisted: The UE performs measurements with or without assistance from the network and sends these measurements to the E-SMLC where the position calculation may take place.

UE-Based: The UE performs measurements and calculates its own position with assistance from the network.

Standalone: The UE performs measurements and calculates its own position without network assistance.

The detailed assistance data may include information about network node or satellite locations, beam directions, etc. The assistance data can be provided to the UE via unicast or via broadcast.

FIG. 4 shows another view of an exemplary positioning architecture in an LTE network. For example, FIG. 4 illustrates how secure user plane location (SUPL) techniques can be supported in LTE networks. In general, SUPL is run on top of the generic LTE user-plane protocol stack. The SUPL solution includes a location server—known as SUPL location platform, SLP (460)—that communicates with a SUPL-enabled terminal (SET), which can be software and/or hardware components of a UE. The SLP also may have a proprietary interface to the E-SMLC (440), which is the location server for control-plane positioning in LTE.

The E-SMLC can communicate with location measurement units (LMUs) via SLm interfaces. As shown in FIG. 4, LMUs can be standalone (e.g., LMU 450) or integrated with an eNB 420. An eNB also may include, or be associated with, one or more transmission points (TPs). The E-SMLC communicates to UEs (e.g., UE 410) via the serving MME (430) and eNB, using the respective SLs, S1, and Uu interfaces shown in FIG. 4. Although not shown, the RRC protocol is used to carry positioning-related information (e.g., to/from E-SMLC) between the UE and the eNB.

E-SMLC 440 can also include, or be associated with, various processing circuitry 442, by which the E-SMLC performs various operations described herein. Processing circuitry 442 can include similar types of processing circuitry as described herein in relation to other network nodes (see, e.g., description of FIG. 18). E-SMLC 440 can also include, or be associated with, a non-transitory computer-readable medium 443 storing instructions (also referred to as a computer program program) that can facilitate the operations of processing circuitry 442. Medium 443 can include similar types of computer memory as described herein in relation to other network nodes (see, e.g., description of FIG. 18). Additionally, E-SMLC 440 can include various communication interface circuitry 441, which can be used, e.g., for communication via the SLs interface. For example, communication interface circuitry 441 can include similar types of communication interface circuitry as described herein in relation to other network nodes (see, e.g., description of FIG. 18)

PRS were introduced in LTE Rel-9 for antenna port 6 because cell-specific reference signals (CRS) were not sufficient for positioning. In particular, CRS could not guarantee a sufficiently high probability of detection. In general, a neighbor cell's synchronization signals (PSS/SSS) and reference signals are detectable when the Signal-to-Interference-and-Noise Ratio (SINR) is at least −6 dB. Simulations have shown that, even in an interference-free environment, this can be only guaranteed for 70% of all cases for the third-best detected cell, meaning that in at least 30% of cases only two neighboring cells are detected. This is not enough and an interference-free environment is not a realistic deployment scenario.

Even so, LTE PRS have some similarities with CRS. In particular, PRS is a pseudo-random QPSK sequence that is mapped in diagonal patterns with shifts in frequency and time to avoid collision with CRS and an overlap with the control channels (e.g., PDCCH).

Figure 5:
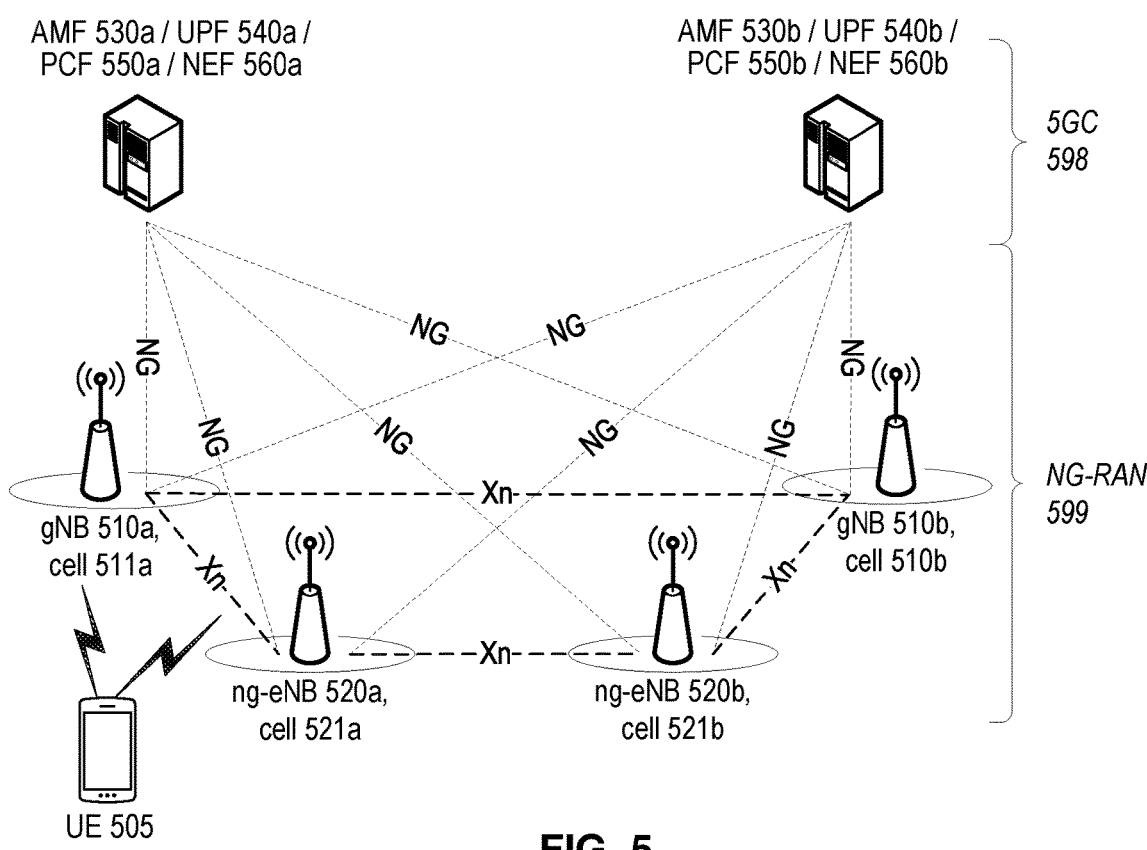
FIG. 5 illustrates a high-level view of a 5G/New Radio (NR) network architecture

As mentioned above, positioning is also expected to be an important application in 5G/NR networks. FIG. 5 shows a high-level view of an exemplary 5G network architecture, including a Next Generation Radio Access Network (NG-RAN) 599 and a 5G Core (5GC) 598. As shown in the figure, NG-RAN 599 can include gNBs (e.g., 510a,b) and ng-eNBs (e.g., 520a,b) that are interconnected with each other via respective Xn interfaces. The gNBs and ng-eNBs are also connected via the NG interfaces to 5GC 598, more specifically to the Access and Mobility Management Function (AMF, e.g., 530a,b) via respective NG-C interfaces and to the User Plane Function (UPF, e.g., 540a,b) via respective NG-U interfaces. Moreover, the AMFs can communicate with one or more policy control functions (PCFs, e.g., 550a,b) and network exposure functions (NEFs, e.g., 560a, b). In some embodiments, 5GC 598 can also include one or more Location Management Functions (LMFs, not shown), which are described in more detail below.

NG-RAN 599 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB can be connected to all 5GC nodes within an "AMF Region."

Each of the gNBs 510a,b can support the NR radio interface, including frequency division duplexing (FDD), time division duplexing (TDD), or a combination thereof. In contrast, each of ng-eNBs 520a,b supports the LTE radio interface but, unlike conventional LTE eNBs (e.g., eNBs 105-115 shown in FIG. 1), connect to the 5GC via the NG interface.

Each of the gNBs and ng-eNBs can serve a geographic coverage area including one more cells, including exemplary cells 511a-b and 521a-b shown in FIG. 5. Depending on the particular cell in which it is located, a UE 505 can communicate with the gNB or ng-eNB serving that particular cell via the NR or LTE radio interface, respectively. In addition, the gNBs 510a,b and ng-eNBs 520a,b can provide multi-RAT (radio access technology) dual connectivity (MR-DC) to UEs. Although FIG. 5 shows gNBs and ng-eNBs separately, it is also possible that a single NG-RAN node provides both types of functionality.

The gNBs and ng-eNBs can also use various directional beams to provide coverage in the respective cells. In general, a DL "beam" is a coverage area of a network-transmitted reference signal (RS) that may be measured or monitored by a UE. In NR, for example, such RS can include any of the following, alone or in combination: synchronization signal/PBCH block (SSB), CSI-RS, tertiary reference signals (or any other sync signal), positioning RS (PRS), demodulation RS (DMRS), phase-tracking reference signals (PTRS), etc. In general, SSB is available to all UEs regardless of RRC state, while other RS (e.g., CSI-RS, DM-RS, PTRS) are associated with specific UEs that have a network connection, i.e., in RRC_CONNECTED state.

Each of the gNBs 510a,b can include a central (or centralized) unit (CU or gNB-CU) and one or more distributed (or decentralized) units (DU or gNB-DU). A CU connects to DUs over respective F1 logical interfaces. The CU and connected DUs are only visible to other gNBs and the 5GC as a gNB, e.g., the F1 interface is not visible beyond gNB-CU. Each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

CUs can host higher-layer protocols and perform various gNB functions such controlling the operation of DUs. For example, a CU can host higher-layer protocols such as, e.g., F1 application part protocol (F1-AP), Stream Control Transmission Protocol (SCTP), GPRS Tunneling Protocol (GTP), Packet Data Convergence Protocol (PDCP), User Datagram Protocol (UDP), Internet Protocol (IP), and RRC. Likewise, DUs can host lower-layer protocols and can include various subsets of the gNB functions, depending on the functional split. For example, a DU can host lower-layer protocols such as RLC, MAC, and PHY.

Figure 6:
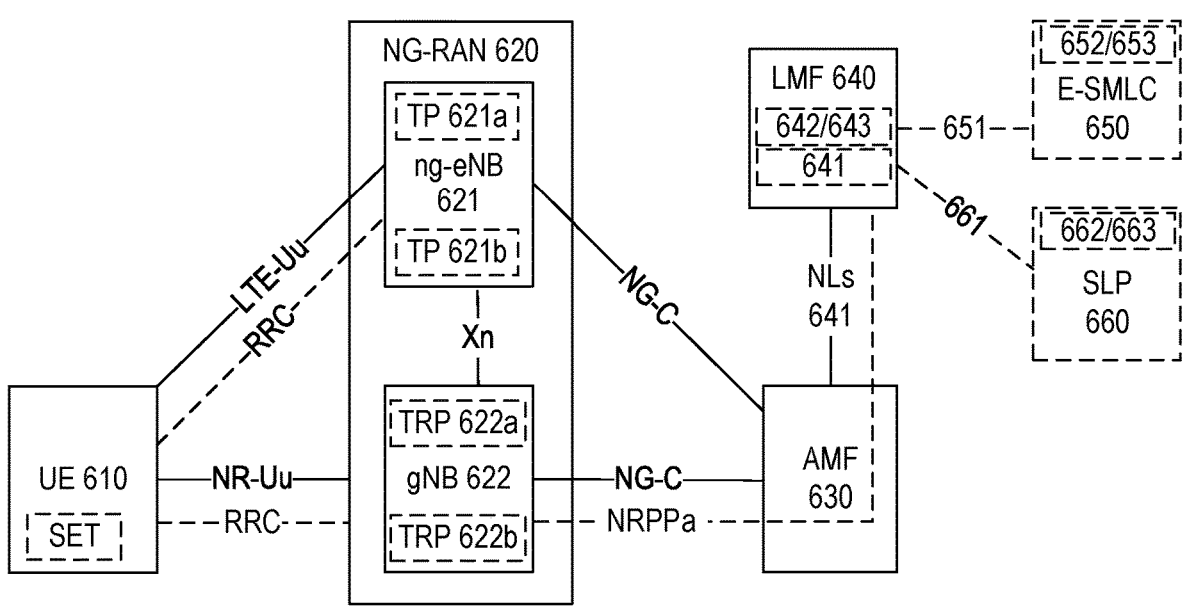
FIG. 6 shows an exemplary positioning architecture for a 5G/NR network.

FIG. 6 is a block diagram illustrating a high-level positioning architecture for NR networks. As shown in FIG. 6, NG-RAN 620 can include nodes such as gNB 622 and ng-eNB 621, similar to the architecture shown in FIG. 5. Each ng-eNB may be associated with and/or control several transmission points (TPs, e.g., 621a-b), such as remote radio heads. Similarly, each gNB may be associated with and/or control several TRPs (e.g., 622a-b). Some or all of the TPs/TRPs may be DL-PRS-only for support of PRS-based TBS.

In addition, the NG-RAN nodes communicate with an AMF 630 in the 5GC via respective NG-C interfaces (both of which may or may not be present), while AMF 630 and LMF 640 communicate via an NLs interface 641. In addition, positioning-related communication between UE 610 and the NG-RAN nodes occurs via the RRC protocol, while positioning-related communication between NG-RAN nodes and LMF occurs via an NRPPa protocol. Optionally, the LMF can also communicate with an E-SMLC 650 and a SUPL 660 in an LTE network via communication interfaces 651 and 661, respectively. Communication interfaces 651 and 661 can utilize and/or be based on standardized protocols, proprietary protocols, or a combination thereof.

LMF 640 can also include, or be associated with, various processing circuitry 642, by which the LMF performs various operations described herein. Processing circuitry 642 can include similar types of processing circuitry as described herein in relation to other network nodes (see, e.g., description of FIG. 18). LMF 640 can also include, or be associated with, a non-transitory computer-readable medium 643 storing instructions (also referred to as a computer program program) that can facilitate the operations of processing circuitry 642. Medium 643 can include similar types of computer memory as described herein in relation to other network nodes (see, e.g., description of FIG. 18). Additionally, LMF 640 can include various communication interface circuitry 641 (e.g., Ethernet, optical, and/or radio transceivers) that can be used, e.g., for communication via the NLs interface. For example, communication interface circuitry 641 can be similar to other interface circuitry described herein in relation to other network nodes (see, e.g., description of FIG. 18).

Similarly, E-SMLC 650 can also include, or be associated with, various processing circuitry 652, by which the E-SMLC performs various operations described herein. Processing circuitry 652 can include similar types of processing circuitry as described herein in relation to other network nodes (see, e.g., description of FIG. 18). E-SMLC 650 can also include, or be associated with, a non-transitory computer-readable medium 653 storing instructions (also referred to as a computer program program) that can facilitate the operations of processing circuitry 452. Medium 453 can include similar types of computer memory as described herein in relation to other network nodes (see, e.g., description of FIG. 18). E-SMLC 650 can also have communication interface circuitry that is appropriate for communicating via interface 651, which can be similar to other interface circuitry described herein in relation to other network nodes (see, e.g., description of FIG. 18).

Similarly, SLP 660 can also include, or be associated with, various processing circuitry 662, by which the SLP performs various operations described herein. Processing circuitry 662 can include similar types of processing circuitry as described herein in relation to other network nodes (see, e.g., description of FIG. 18). SLP 660 can also include, or be associated with, a non-transitory computer-readable medium 663 storing instructions (also referred to as a computer program program) that can facilitate the operations of processing circuitry 662. Medium 663 can include similar types of computer memory as described herein in relation to other network nodes (see, e.g., description of FIG. 18). SLP 660 can also have communication interface circuitry that is appropriate for communicating via interface 661, which can be similar to other interface circuitry described herein in relation to other network nodes (see, e.g., description of FIG. 18).

In a typical operation, the AMF can receive a request for a location service associated with a particular target UE from another entity (e.g., a gateway mobile location center (GMLC)), or the AMF itself can initiate some location service on behalf of a particular target UE (e.g., for an emergency call from the UE). The AMF then sends a location services (LS) request to the LMF. The LMF processes the LS request, which may include transferring assistance data to the target UE to assist with UE-based and/or UE-assisted positioning; and/or positioning of the target UE. The LMF then returns the result of the LS (e.g., a position estimate for the UE and/or an indication of any assistance data transferred to the UE) to the AMF or to another entity (e.g., GMLC) that requested the LS.

An LMF may have a signaling connection to an E-SMLC, enabling the LMF to access information from E-UTRAN, e.g., to support E-UTRA OTDOA positioning using down-link measurements obtained by a target UE. An LMF can also have a signaling connection to an SLP, the LTE entity responsible for user-plane positioning.

Various interfaces and protocols are used for, or involved in, NR positioning. The LTE Positioning Protocol (LPP) is used between a target device (e.g., UE in the control-plane, or SET in the user-plane) and a positioning server (e.g., LMF in the control-plane, SLP in the user-plane). LPP can use either the control- or user-plane protocols as underlying transport. NRPP is terminated between a target device and the LMF. RRC protocol is used between UE and gNB (via NR radio interface) and between UE and ng-eNB (via LTE radio interface).

Furthermore, the NR Positioning Protocol A (NRPPa) carries information between the NG-RAN Node and the LMF and is transparent to the AMF. As such, the AMF routes the NRPPa PDUs transparently (e.g., without knowledge of the involved NRPPa transaction) over NG-C interface based on a Routing ID corresponding to the involved LMF. More specifically, the AMF carries the NRPPa PDUs over NG-C interface either in UE associated mode or non-UE associated mode. The NGAP protocol between the AMF and an NG-RAN node (e.g., gNB or ng-eNB) is used as transport for LPP and NRPPa messages over the NG-C interface. NGAP is also used to instigate and terminate NG-RAN-related positioning procedures.

LPP/NRPP are used to deliver messages such as positioning capability request, OTDOA positioning measurements request, and OTDOA assistance data to the UE from a positioning node (e.g., location server). LPP/NRPP are also used to deliver messages from the UE to the positioning node including, e.g., UE capability, UE measurements for UE-assisted OTDOA positioning, UE request for additional assistance data, UE configuration parameter(s) to be used to create UE-specific OTDOA assistance data, etc. NRPPa is used to deliver the information between ng-eNB/gNB and LMF in both directions. This can include the LMF requesting some information from ng-eNB/gNB, and ng-eNB/gNB providing some information to the LMF. For example, this can include information about PRS transmitted by ng-eNB/gNB that are to be used for OTDOA positioning measurements by the UE.

NR networks will support positioning methods similar to LTE E-CID, OTDOA, and UTDOA but based on NR measurements. NR may also support one or more of the following position methods:

Multi-RTT: The device (e.g., UE) computes UE Rx-Tx time difference and gNBs compute gNB Rx-Tx time difference. The results are combined to find the UE position based upon round trip time (RTT) calculation.

DL angle of departure (DL-AoD): gNB or LMF calculates the UE angular position based upon UE DL RSRP measurement results (e.g., of PRS transmitted by network nodes).

UL angle of arrival (UL-AoA): gNB calculates the UL AoA based upon measurements of a UE's UL SRS transmissions.

Each of the NR positioning methods can be supported in UE-assisted, UE-based or UE-standalone modes, similar to LTE discussed above.

Additionally, NR Rel-16 includes support for broadcasting of positioning assistance data via Positioning System Information Blocks (posSIBs), as specified in 3GPP TS 38.331 (v16.2.0). The posSIBs are carried in RRC System Information (SI) messages. The supported posSibTypes are shown in Table 1 below (also 3GPP TS 38.331 Table 7.2-1). The GNSS Common and Generic Assistance Data information elements (IEs) are defined in 3GPP TS 37.355 (v16.2.0) section 6.5.2.2. The OTDOA Assistance Data IEs and NR DL-TDOA/DL-AoD Assistance Data IEs are defined in 3GPP TS 37.355 section 7.4.2. The Barometric Assistance Data IEs are defined in 3GPP TS 37.355 section 6.5.5.8. The TBS (based on MBS signals) Assistance Data IEs are defined in 3GPP TS 37.355 section 6.5.4.8.

TABLE 1

| | posSibType | assistanceDataElement |
|---|---|---|
| GNSS Common | posSibType1-1 | GNSS-ReferenceTime |
| Assistance Data | posSibType1-2 | GNSS-ReferenceLocation |
| | posSibType1-3 | GNSS-IonosphericModel |
| | posSibType1-4 | GNSS-EarthOrientationParameters |
| | posSibType1-5 | GNSS-RTK-ReferenceStationInfo |
| | posSibType1-6 | GNSS-RTK-CommonObservationInfo |
| | posSibType1-7 | GNSS-RTK-AuxiliaryStationData |
| | posSibType1-8 | GNSS-SSR-CorrectionPoints |
| GNSS Generic | posSibType2-1 | GNSS-TimeModelList |
| Assistance Data | posSibType2-2 | GNSS-DifferentialCorrections |
| | posSibType2-3 | GNSS-NavigationModel |
| | posSibType2-4 | GNSS-RealTimeIntegrity |
| | posSibType2-5 | GNSS-DataBitAssistance |
| | posSibType2-6 | GNSS-AcquisitionAssistance |
| | posSibType2-7 | GNSS-Almanac |
| | posSibType2-8 | GNSS-UTC-Model |
| | posSibType2-9 | GNSS-AuxiliaryInformation |
| | posSibType2-10 | BDS-DifferentialCorrections |
| | posSibType2-11 | BDS-GridModelParameter |
| | posSibType2-12 | GNSS-RTK-Observations |
| | posSibType2-13 | GLO-RTK-BiasInformation |
| | posSibType2-14 | GNSS-RTK-MAC-CorrectionDifferences |
| | posSibType2-15 | GNSS-RTK-Residuals |
| | posSibType2-16 | GNSS-RTK-FKP-Gradients |
| | posSibType2-17 | GNSS-SSR-OrbitCorrections |
| | posSibType2-18 | GNSS-SSR-ClockCorrections |
| | posSibType2-19 | GNSS-SSR-CodeBias |
| | posSibType2-20 | GNSS-SSR-URA |
| | posSibType2-21 | GNSS-SSR-PhaseBias |
| | posSibType2-22 | GNSS-SSR-STEC-Correction |
| | posSibType2-23 | GNSS-SSR-GriddedCorrection |
| | posSibType2-24 | NavIC-DifferentialCorrections |
| | posSibType2-25 | NavIC-GridModelParameter |
| OTDOA Assistance Data | posSibType3-1 | OTDOA-UE-Assisted |
| Barometric Assistance Data | posSibType4-1 | Sensor-AssistanceDataList |
| TBS Assistance Data | posSibType5-1 | TBS-AssistanceDataList |
| NR DL-TDOA/ | posSibType6-1 | NR-DL-PRS-AssistanceData |
| DL-AOD | posSibType6-2 | NR-UEB-TRP-LocationData |
| Assistance Data | posSibType6-3 | NR-UEB-TRP-RTD-Info |

Recent advances in massive antenna systems (massive MIMO) can provide additional degrees of freedom to enable a more accurate user location estimation by exploiting spatial and angular domains of the propagation channel in combination with time measurements. These spatial techniques, also referred to as "beamforming", can be used on transmission beams and/or reception beams, by the network or by the UE.

Currently, two NR frequency ranges are explicitly distinguished in 3GPP: FR1 (below 6 GHz) and FR2 (24.2-52.6 GHz). It is known that high-frequency radio communication above 6 GHz suffers from significant path loss and penetration loss. One solution to address this issue is to deploy large-scale antenna arrays to achieve high beamforming gain, which is a reasonable solution due to the small wavelength of high-frequency signal. Such solutions are often referred to as multiple-input multiple-output (MIMO) or, in the case of large-scale antenna arrays anticipate for NR, massive MIMO. In particular, up to 64 beams are supported for FR2. In addition, it is expected that the greater number of antenna elements will also be used in FR1 to obtain more beamforming and multiplexing gain.

With massive MIMO, three approaches to beamforming have been discussed: analog, digital, and hybrid (a combination of analog and digital). Analog beamforming can compensate for high pathloss in NR scenarios, while digital precoding can provide additional performance gains (e.g., similar to MIMO for FR1) necessary to achieve a reasonable coverage. The implementation complexity of analog beamforming is significantly less than digital since it can utilize simple phase shifters, but it is limited in terms of multi-direction flexibility (i.e., a single beam can be formed at a time and the beams are then switched in time domain), transmission bandwidth (i.e., not possible to transmit over a sub-band), inaccuracies in the analog domain, etc.

Digital beamforming, which is often used today in LTE networks, provides the best performance in terms of data rate and multiplexing capabilities. For example, multiple beams over multiple sub-bands can be formed simultaneously. Even so, digital beamforming presents challenges in terms of power consumption, integration, and cost. Furthermore, while cost generally scales linearly with the number of transmit/receive units, the gains of digital beamforming increase more slowly.

Figure 7:
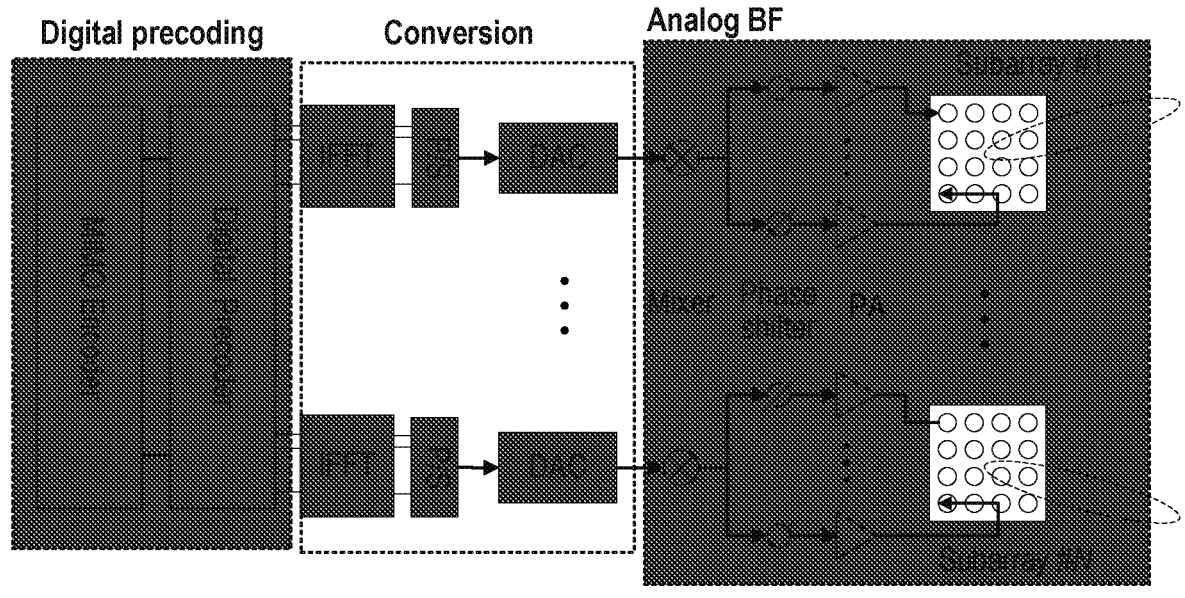
FIG. 7 shows an exemplary hybrid transmit (Tx) beam-forming arrangement.

Hybrid beamforming, which provides cost benefits from analog beamforming and capacity benefits from digital beamforming, is therefore desirable for NR. FIG. 7 shows an exemplary hybrid transmit (TX) beamforming arrangement, which includes a digital precoding section and an analog beamforming (BF) section that are coupled by intermediate conversion circuitry. As shown in FIG. 7, the analog BF portion includes independent analog circuitry for each of N subarrays of antenna elements. For each subarray, the analog circuitry includes mixers (e.g., from IF to RF), phase shifters, and power amplifiers (PAs). Each subarray can generate a beam separate from other subarrays. The conversion circuitry includes independent IFFT modulators, parallel-to-serial converters (P/S), and digital-to-analog converters (DAC) for each of the N channels of the analog BF circuitry.

Figure 8A:
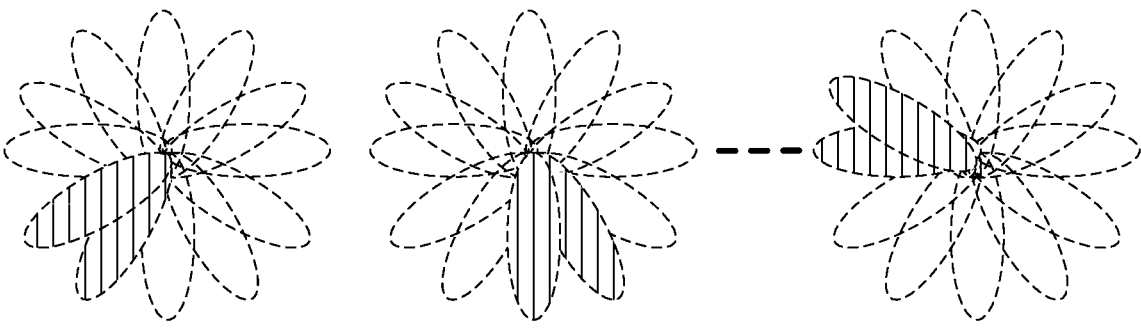
FIGS. 8A-B show two exemplary beam sweeping arrangements for multiple subarrays.
Figure 8B:
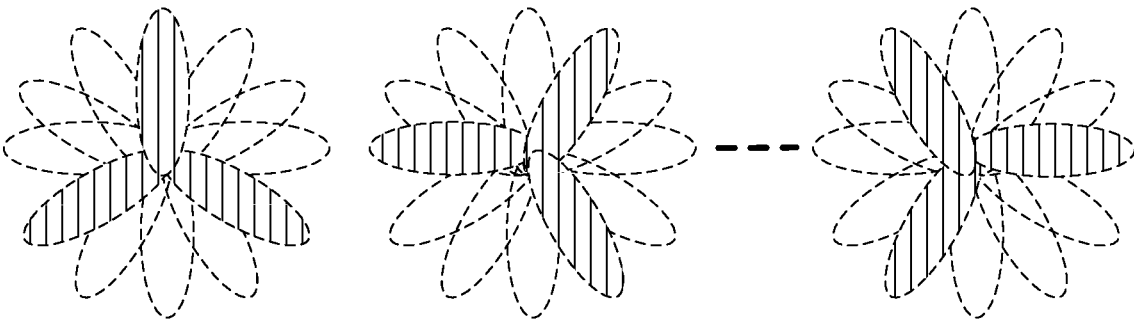

The analog beam of a subarray can be steered toward a single direction on each OFDM symbol, and hence the number of subarrays determines the number of beam directions and the corresponding coverage on each OFDM symbol. However, the number of beams to cover an entire served area is typically larger than the number of subarrays, especially when the individual beam-width is narrow. Therefore, to cover the entire served area, multiple transmissions with narrow beams steered differently in time domain are also likely to be needed. The provision of multiple narrow coverage beams for this purpose has been called "beam sweeping". FIGS. 8A-B show two exemplary beam sweeping arrangements involving two subarrays and three subarrays, respectively.

For analog and hybrid beamforming, beam sweeping can be very important for providing necessary coverage in NR networks. For this purpose, multiple OFDM symbols, in which differently steered beams can be transmitted through subarrays, can be assigned and periodically transmitted. In general, both RX and TX beam sweeping function in a similar manner at the base station side.

UEs and gNBs also perform beam measurements to evaluate quality of the received signal on DL and UL beams, respectively. For example, a UE measures quality on SSB beams based on parameters such as SS-SINR (signal-to-interference-and-noise ratio), SS-RSRP (reference signal received power), SS-RSRQ (reference signal received quality), etc. A gNB performs similar measurements on UL beams (e.g., SRS) from a UE but gNB measurements are not specified by 3GPP and left to vendor implementation. UEs and gNBs also perform beam determination to determine a best or most suitable DL and UL beam, respectively, based on the beam measurements. UEs also report beam quality measurements and beam determination results to the gNB.

Additionally, when a UE in RRC_CONNECTED state experiences poor channel conditions, it receives a beam failure indication from its lower layers (e.g., PHY) and can request beam recovery by sending a message to its serving gNB.

Several signals can be transmitted from the same gNB antenna but from different antenna ports. These signals can have the same large-scale properties, such as in terms of Doppler shift/spread, average delay spread, and/or average delay. These antenna ports are then said to be "quasi co-located" or "QCL". The network can signal to the UE that two antenna ports are QCL with respect to one or more parameters. Once the UE knows that two antenna ports are QCL with respect to a certain parameter (e.g., Doppler spread), the UE can estimate that parameter based on one of the antenna ports and use that estimate when receiving the other antenna port. Typically, the first antenna port is represented by a measurement reference signal such as CSI-RS (referred to as "source RS") and the second antenna port is represented by DMRS or PRS (referred to as "target RS").

For instance, if antenna ports A and B are QCL with respect to average delay, the UE can estimate the average delay from the signal received from antenna port A (source RS) and assume that the signal received from antenna port B (target RS) has the same average delay. This can be useful for demodulation since the UE can know beforehand the properties of the channel when trying to measure the channel utilizing the DMRS.

The term "spatial relation" to refer to a relationship between an UL RS and another RS, which can be either a DL RS or an UL RS. Unlike QCL, spatial relation is defined from a UE perspective, such that if the UL RS is spatially related to a DL RS, it means that the UE should transmit the UL RS in the opposite (reciprocal) direction from which it received the corresponding DL RS. More precisely, the UE should apply the "same" Tx spatial filtering (or beamforming) configuration for transmitting the spatially-related UL RS as the Rx spatial filtering (or beamforming) configuration that it used for receiving the corresponding DL RS.

NR Rel-16 positioning supports beamforming. The DL PRS is constructed as a DL PRS Resource set consisting of multiple DL PRS Resources. Each DL PRS Resource is transmitted over a separate beam. An UL SRS can have a spatial relation to a DL PRS Resource as signaled through the combination of a DL PRS Resource set ID and a DL PRS Resource ID. The UE will then transmit the UL SRS using the same antenna panel as it uses to receive the corresponding DL PRS resource and using the same (reciprocal) beam as it uses to receive the DL PRS Resource.

In the study item (SI) phase of 3GPP Rel-17 NR positioning enhancements, RAN1 and RAN2 working groups (WGs) are currently discussing potential support of "on-demand PRS" in the network. One possible implementation is similar to on-demand System Information (SI), such that the UE can request a PRS configuration from Msg1 or Msg3 of the random access (RA) procedure. Upon receiving this UE request, the serving gNB would inform the LMF, which can then identify relevant neighbor gNBs/TRPs and request PRS transmission from these.

Figure 9:
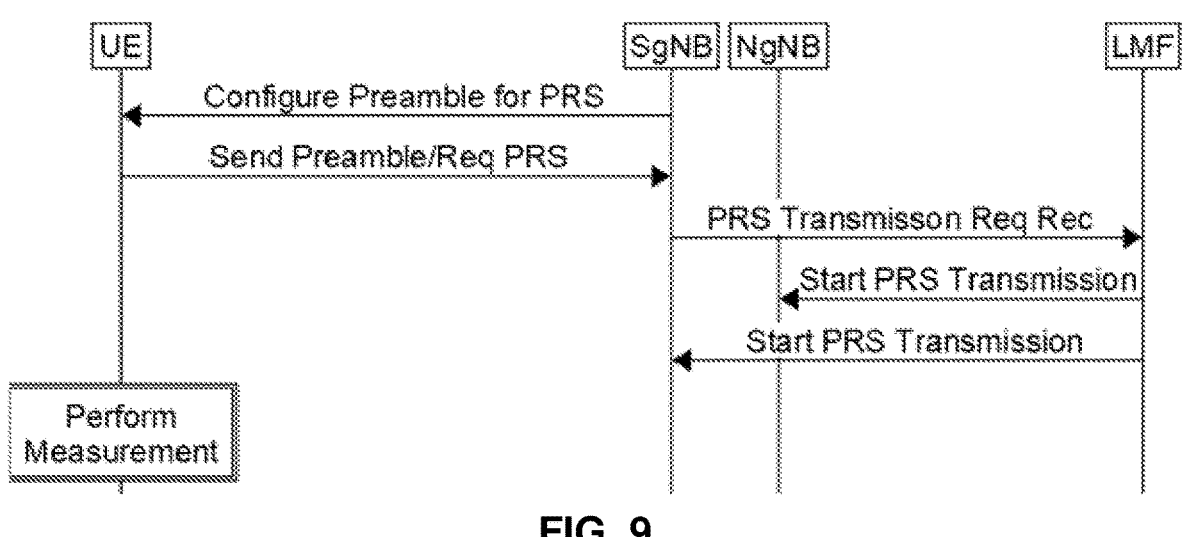
FIG. 9 shows a signal flow diagram for a conventional on-demand PRS request procedure.

FIG. 9 shows a signal flow diagram between the UE, serving gNB (SgNB), a neighbor gNB (NgNB), and LMF for an exemplary on-demand PRS request procedure. as shown in FIG. 9. The serving gNB configures the UE with a RA (or RACH) preamble that corresponds to a PRS request. The UE subsequently sends the preamble (e.g., as part of Msg1), which the serving gNB interprets as an on-demand PRS request and informs the LMF. The LMF then informs the serving and neighbor gNB to begin PRS transmission according to the UE request. The UE can then perform measurements on the transmitted PRS.

Even so, the techniques exemplified by FIG. 9 involve a lot of signalling between network nodes as well as increased load on RACH. Additionally, the inter-node signaling also introduces delay or latency due to NRPPa transport procedures involving the LMF (e.g., over backhaul). This may result in delayed PRS transmission that is untimely from the UE's perspective. As such, a reduced-latency solution is needed, particularly for when the current PRS configuration needs to be modified by the NG-RAN for energy efficiency and better PRS-based positioning. Exemplary modifications to PRS configurations include requests for denser PRS, more repetitions, shorter periodicity, different frequency(ies), etc.

In addition, any PRS transmission overhead problems are multiplied by the total number of gNBs/TRPs (i.e., serving and neighbor) that are transmitting PRS according to each UE's on-demand request. Furthermore, the single-UE request procedure shown in FIG. 9 may not be scalable for the network. In particular, several UEs (e.g., proximate within coverage of same serving and neighbor gNBs/TRPs) may require PRS at the approximately the same time, such that the LMF may not be able to tune PRS transmission configurations for any particular one of the UEs. The combination of NRPPa signaling latency and conflicting PRS requirements may result in a particular gNB being unable to fulfill all the requests for PRS (re)-configuration associated with multiple UEs.

Furthermore, PRS transmission may need to be beam-formed to compensate for higher path loss at higher carrier frequencies (e.g., FR2). Beam sweeping PRS in all directions (e.g., as in FIGS. 8A-B) results in unnecessary PRS transmissions, i.e., to coverage areas that do not include UEs needing PRS. Accordingly, there is a need for a solution that reduces inter-node signaling (and corresponding latency) and improves the efficiency of PRS transmissions to the most appropriate directions, such that PRS transmission can be disabled in certain beams to reduce PRS overhead, energy consumption, and interference.

Embodiments of the present disclosure can address these and other issues, problems, and/or difficulties by providing novel, flexible, and efficient techniques for a positioning node (e.g., LMF) to provision RAN nodes (e.g., gNBs) with meaningful PRS information. For example, various embodiments can employ a newly defined NRPPa "PRS Activity Reporting" message that can include various information such as:

PRS measurement reports provided by UE(s) to the LMF over LPP. Such a report can contain the PRS resources and the RSRP measurement information from the best available TRPs/cells on each frequency layer.

The number of UEs for which this resource reporting is valid.

Aggregated PRS beam utilization statistics from several UEs, e.g., to help gNB adapt PRS beam transmission.

Other assistance information.

Various embodiments are based on, or consistent with, the principle that a RAN node owns and controls its own radio resources and any solution designed to reduce radio resource overhead should be controlled by the RAN node itself. Accordingly, in some embodiments, a RAN node may subscribe to or request a PRS activity report from the LMF, and LMF may provide the report to requesting or subscribing RAN nodes. In other embodiments, the LMF may provide such a report unsolicited (i.e., without request or subscription), e.g., periodically every X time units. For example, this reporting period can be configured via an operations/administration/maintenance (OAM) function associated with the RAN. A receiving gNB may acknowledge the report by responding to the LMF.

In other variants, a RAN node may subscribe to or request a PRS activity report from the LMF, and LMF may provide a periodic report every X time units in response to the single request. The LMF may send only a certain number of such reports in response to the single request, with the number being predetermined or based on a predetermined duration and the reporting period, X. The predetermined number or duration can be configured via the OAM function.

In this manner, embodiments of the present disclosure can provide various advantages, benefits, and/or solutions to problems. For example, such techniques enable the LMF to provide a PRS activity report in which it can map the measurement information received from each UE over LPP, understand which PRS report belongs to which beam/resource/resource-set transmitted by each gNB/TRP, and provide such RAN nodes with a report relevant to their needs. Moreover, such techniques can reduce signaling overhead by aggregating measurements by multiple UEs into a single report to a particular RAN node. Furthermore, such techniques are transparent to UEs and do not impact UE implementation or require standardization of new UE procedures (e.g., in RRC). As such, legacy UEs can also benefit. In addition, such techniques reduce PRS transmission overhead, energy consumption, and interference, since PRS activity reports include information that enables RAN nodes to selectively transmit PRS beams only to coverage areas with UEs needing such beams and to turn off PRS beams in other coverage areas.

The embodiments summarized above will now be described in more detail.

In some embodiments, a positioning node (e.g., LMF) receives a PRS measurement reporting from a UE via LPP and stores this information in a general PRS activity report. The received/stored information can include identities of the measured PRS and corresponding RSRP measurements. The positioning node can aggregate PRS measurement reporting from multiple UEs into a single PRS activity report, which can be sent according to various procedures described below. Exemplary contents of a PRS activity report are also discussed below.

In some embodiments, the positioning node can send one or more PRS activity reports (e.g., as NRPPa messages) to a RAN node (e.g., gNB, ng-eNB) without solicitation (e.g., request or subscription) by the RAN node. For example, the positioning node can send a single unsolicited report or a plurality of unsolicited reports, e.g., one every reporting period of X time units. The reporting period X may be configured by OAM (as mentioned above), determined by the LMF based on prevailing conditions, or predetermined (e.g., specified by 3GPP). Likewise, the OAM function can trigger the positioning node to send a single unsolicited PRS activity report to a RAN node.

Figure 10:
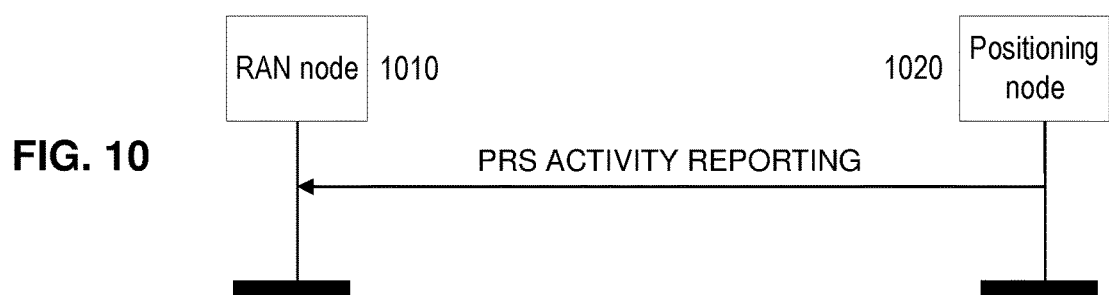
Figure 11:
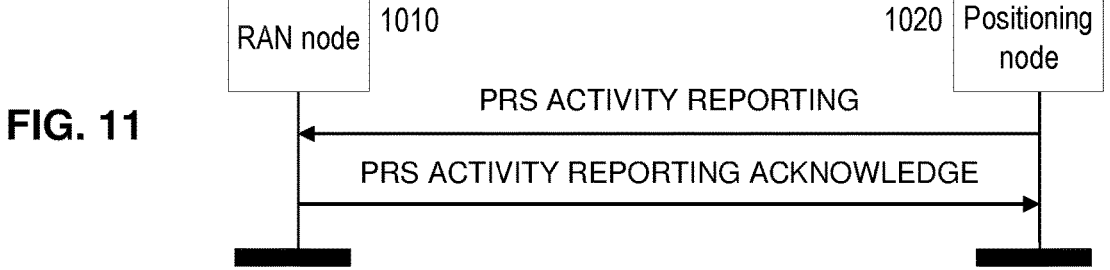

FIG. 10 shows a signal flow diagram between a RAN node (1010) and a positioning node (1020) that exemplifies these embodiments. Although FIG. 10 shows a single PRS activity report sent by the positioning node, skilled persons will comprehend that the single report shown can be repeated every reporting period, X. The procedure shown in FIG. 10 is also known as a "class 2 procedure" since the RAN node does not respond to the received report. In contrast FIG. 11 shows a signal flow diagram of an exemplary "class 1 procedure" in which the RAN node (1010) sends the positioning node (1020) a PRS Activity Reporting Acknowledge message in response to the received report.

For periodic reporting, the RAN node can send such a message in response to each report received.

Figure 12:
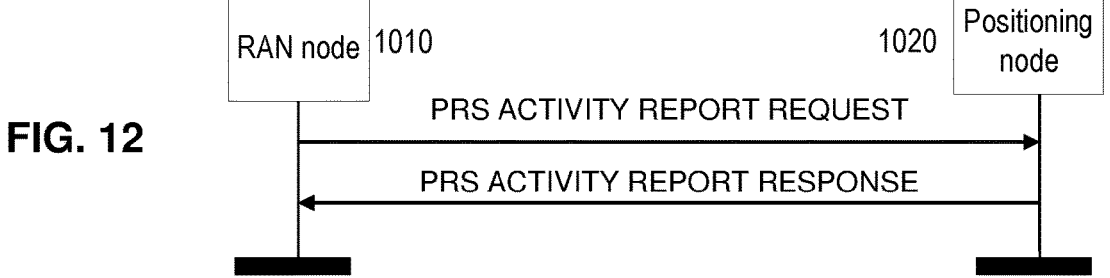

In other embodiments, a RAN node can request or subscribe to receiving PRS activity reports from a positioning node. In different variants, existing or newly-define NRPPa messages can be used for such a request. FIG. 12 shows a signal flow diagram between a RAN node (1010) and a positioning node (1020) that exemplifies these embodiments. In particular, FIG. 12 shows a class 1 procedure in which the RAN node sends a PRS Activity Report Request message to request a PRS activity report of UEs known by the positioning node, which replies with a PRS Activity Report Response message including the requested information.

In a variation of these embodiments, the positioning node can send multiple PRS Activity Report Response messages to a single PRS Activity Report Request message. The multiple responses can be periodic or semi-periodic, and either persistent or semi-persistent (e.g., terminating after some number). For example, the positioning node can send the PRS Activity Report Response every X time units until a certain number of reports have been provided or a certain amount of time has elapsed, as mentioned above.

In the various embodiments described above, the PRS Activity Report (or PRS Activity Report Response) message from the positioning node can include the following:

List of PRS resources set that can be configured by the RAN node or TRPs associated with the RAN node;

PRS Resource ID for each resource set;

For each PRS resource ID:

The number of UEs that have reported good RSRP values,

Their average RSRP, and (Optionally) QCL information for each PRS resource.

Since there can be multiple PRS resource sets configured for a RAN node (or TRP), then for each PRS resource included in the PRS Activity Report, the corresponding PRS Resource Set ID is also included. In this manner, the RAN node receiving the PRS Activity Report knows to which PRS Resource Set ID a given PRS resource in the PRS Activity Report corresponds.

In some embodiments, the PRS Activity Report can provide beam-level (e.g., per DL-PRS resource ID) information or information aggregated to a DL-PRS resource set level. For example, if all beams of a resource set are performing below or above a certain threshold, the aggregated result can provide all needed information with reduced signaling overhead.

In some embodiments, the PRS Activity report may also be based upon some pre-requisite procedure such as enhanced cell ID positioning, spatial relation formation (e.g., DL and UL beam correspondence), or QCL of two signals transmitted from same antenna port. The PRS Activity Report then provides a recommendation to a RAN node which beams should be used for PRS transmission based on this beam identification.

The following tables provide some exemplary contents of messages shown in FIGS. 10-12. Such tables can be incorporated into 3GPP standards, such as 3GPP TS 38.455. In particular, Table 2 below provides exemplary contents of a PRS Activity Reporting message shown in FIGS. 10-11 or the PRS Activity Report Response message shown in FIG. 12, with reporting on the beam or DL-PRS-Resource level. This message is sent from the LMF to inform the RAN node of PRS Activity report associated with the RAN node that the LMF is currently aware of.

TABLE 2

| IE/Group Name | Presence | IE type/ref. | Semantics description |
|---|---|---|---|
| Message Type | M | 9.2.3 | |
| NRPPa Transaction ID | M | 9.2.4 | |
| PRS Resource Set List | | 1 . . . <maxnoPRSResourceSet> | |
| >PRS Resource Set ID | M | INTEGER(0 . . . 7) | |
| >PRS Resource List | | 1 . . . <maxnoPRSResource> | |
| >>PRS resource ID | M | INTEGER(0 . . . 63) | |
| >>UE statistics | M | | |
| >>>Number of UEs | M | INTEGER(0 . . . N) | |
| >>>Number of UEs above RSRP Threshold | M | INTEGER(0 . . . N) | |
| >>>average RSRP | O | INTEGER (0 . . . 127) | |
| >>>average RSRQ | O | INTEGER (0 . . . 127) | |
| >>CHOICE QCL Info | O | | |
| >>>SSB | | | |
| >>>>NR PCI | M | INTEGER(0 . . . 1007) | |
| >>>>SSB Index | O | INTEGER(0 . . . 63) | |
| >>>DL-PRS | | | |
| >>>>QCL Source PRS Resource Set ID | M | INTEGER(0 . . . 7) | |
| >>>>QCL Source PRS Resource ID | O | INTEGER(0 . . . 63) | If absent, the QCL source PRS resource ID is the same as the PRS resource ID. |

| Range bound | Explanation |
|---|---|
| maxnoofPRSresourceSet | Maximum number of PRS resources set. Value is 8. |
| maxnoofPRSresource | Maximum number of PRS resources per PRS resource set. Value is 64. |

Table 3 below shows exemplary contents of a PRS Activity Reporting Acknowledge message as shown in FIG. 11. This message is sent from the RAN node to acknowledge a PRS Activity Report received from the positioning node.

TABLE 3

| IE/Group Name | Presence | IE type/ref. | Semantics description |
|---|---|---|---|
| Message Type | M | 9.2.3 | |
| NRPPa Transaction ID | M | 9.2.4 | |

Table 4 below shows exemplary contents of a PRS Activity Report Request message as shown in FIG. 12. This message is sent from the RAN node to request PRS Activity Report from the positioning node.

TABLE 4

| IE/Group Name | Presence | IE type/ref. | Semantics description |
|---|---|---|---|
| Message Type | M | 9.2.3 | |
| NRPPa Transaction ID | M | 9.2.4 | |
| PRS resource Information Request | M | ENUMERATED (TRUE) | |

Upon reception of the PRS Activity Report message, the RAN node can use the received information to determine whether or not to activate the respective PRS beams (or resources) in the cell(s) that it serves. For example, if a PRS Activity Report shows that various UEs have reported good RSRP values for certain beams (or TRPs), the RAN node can determine to activate those beams (or TRPs). Conversely, if the PRS Activity Report shows that UEs have reported poor RSRP values, the RAN node can refrain from activating (or deactivate) those beams (or TRPs).

In some embodiments, the RAN node can inform the positioning node, and/or one or more UEs, of the actions it took responsive to the PRS Activity Report. For example, the RAN node may provide an updated DL-PRS Info indicating which beams are activated and which beams have been deactivated. This can be sent in new message or in existing IE such as the DL-PRS Info IE defined in 3GPP TS 38.455. FIG. 13 shows a signal flow diagram between a RAN node (1010) and a positioning node (1020) that exemplifies these embodiments. The RAN node sends a PRS Activity Report Action message (indicating actions taken) and the positioning node responds with a PRS Activity Report Ack message (indicating acknowledgement of receipt). The PRS Activity Report Action message can be responsive to a PRS Activity Report message (in FIGS. 11A-B) or a PRS Activity Report Response message (in FIG. 12).

The positioning node can consider the reported RAN node actions in determining subsequent PRS configuration and/or posSIB contents for broadcasting to UEs. For example, the positioning node may determine in which cells to broadcast assistance data pertaining to activated beams. Table 5 below shows some exemplary broadcast assistance data that can be occasionally updated by the positioning node based on RAN node actions reported.

TABLE 5

| NR DL-TDOA/DL-AOD Assistance Data (clauses 6.4.3, 7.4.2) | posSibType6-1 posSibType6-2 posSibType6-3 | NR-DL-PRS-AssistanceData NR-UEB-TRP-LocationData NR-UEB-TRP-RTD-Info |
|---|---|---|

UEs would need to monitor SI on a regular basis for any update to posSIB contents listed in Table 5. The UE monitoring update rate of posSIB content may depend upon the rate at which gNB asks for the update of the PRS activity report from LMF. This timing information can be provided by LMF using LPP or via gNB using RRC system information broadcast info.

As mentioned above, a RAN node may dynamically switch on/off DL-PRS beams based on PRS Activity Reports from the positioning node. In some embodiments, the RAN can provide UEs (e.g., via SI broadcast) an indication (e.g., single bit) that such on-demand (e.g., dynamic) PRS activation has been enabled or disabled. A UE performing PRS measurements may not be aware that certain previously-activated PRS beams have been deactivated. Thus, if UE detects no energy on a previously-active PRS beam but has received the SI indication that on-demand PRS activation has been enabled, the UE can assume that the particular PRS beam has been deactivated and skip measurements of that beam.

Variations of the above-described embodiments are also contemplated. As an example, a RAN node can provide its initial PRS configuration to the positioning node. In such case, it could be that none of the RAN node's associated TRPs are transmitting PRS. Subsequently, the positioning node can receive a request for positioning a UE from an LCS client (e.g., the UE itself, the RAN node, or an external LCS client). The positioning node can identify some preferred TRPs and beams for the target UE, e.g., based on an initial enhanced cell-ID positioning procedure. The positioning node can then send a PRS activity report to the RAN node (and optionally one or more neighbor RAN nodes), indicating the need to enable PRS transmission in the preferred TRPs/beams. The RAN node(s) can activate PRS transmissions accordingly, optionally providing PRS Activity Report Action indicating actions taken responsive to the PRS activity report.

Optionally, the positioning node can send an updated PRS activity report to the RAN node(s), indicating newly preferred TRPs and beams and/or any changes from the most recent PRS activity report. The RAN node(s) can activate and/or deactivate PRS transmissions accordingly, optionally providing PRS Activity Report Action indicating actions taken responsive to the PRS activity report. The positioning node can take into account the information provided in the updated PRS activity report (and optionally the responsive information provided by the RAN node(s)) when determining broadcast assistance data.

The embodiments described above can be further illustrated with reference to FIGS. 14-16, which depict exemplary methods (e.g., procedures) for a positioning node, a RAN node, and a UE, respectively. Put differently, various features of the operations described below correspond to various embodiments described above. Furthermore, the exemplary methods shown in FIGS. 14-16 can be used cooperatively to provide various exemplary benefits and solve various exemplary problems, including those described herein. Although FIGS. 14-16 show specific blocks in particular orders, the operations of the exemplary methods can be performed in different orders than shown and can be combined and/or divided into blocks having different functionality than shown. Optional blocks or operations are indicated by dashed lines.

In particular, FIG. 14 shows a flow diagram of an exemplary method (e.g., procedure) for a positioning node associated with a RAN, according to various embodiments of the present disclosure. The exemplary method can be performed by a positioning node or function (e.g., E-SMLC, SLP, LMF, etc., or component thereof) such as described elsewhere herein.

The exemplary method can include the operations of block 1420, where the positioning node can receive, from a plurality of UEs, measurements made by the respective UEs on PRS transmitted by a plurality of TRPs in the RAN. The exemplary method can also include the operations of block 1440, where the positioning node can send, to one or more RAN nodes, respective PRS activity reports that include information about measurements made by the UEs on PRS transmitted by TRPs associated with the respective RAN nodes.

In some embodiments, the exemplary method can also include the operations of block 1410, where the positioning node can receive, from the RAN nodes, respective requests for PRS activity reporting. In such embodiments, the respective PRS activity reports are sent (e.g., in block 1420) in response to the respective requests. An example is shown in FIG. 12.

In some embodiments, the exemplary method can also include the operations of block 1450, where the positioning node can receive, from the RAN nodes, respective acknowledgements of the respective PRS activity reports. An example is shown in FIG. 11.

In some embodiments, the exemplary method can also include the operations of block 1430, where the positioning node can receive, from the plurality of UEs, updated measurements made by the UEs on PRS transmitted by the plurality of TRPs. In such embodiments, the sending operations of block 1440 can include the operations of sub-block 1441, where the positioning node can send periodic PRS activity reports to each of the one or more RAN nodes. Each periodic PRS activity report can be based on updated measurements received by the positioning node before sending the particular periodic PRS activity report. In some embodiments, sending the periodic PRS activity reports in sub-block 1441 can be responsive to one of the following: a single request, from each of the RAN nodes, for PRS activity reports; or a configuration received from an operations/administration/maintenance (OAM) function associated with the RAN.

In some embodiments, the sending operations of block 1440 can include the operations of sub-block 1442, where the positioning node can stop the sending after a particular number of periodic PRS activity reports is sent to each of the RAN nodes. The particular number can be determined based on a predetermined or configured number, or based on a period (e.g., X discussed above) of the periodic PRS activity reports and a predetermined or configured reporting duration.

In some embodiments, the exemplary method can also include the operations of block 1460, where the positioning node can receive, from the RAN nodes, respective action reports indicating updated PRS transmission configurations for TRPs associated with the respective RAN nodes. An example is shown in FIG. 13. In some of these embodiments, each of the updated PRS transmission configurations indicates one or more PRS that has been activated or deactivated responsive to a PRS activity report from the positioning node.

In some of these embodiments, the exemplary method can also include the operations of blocks 1470-1480. In block 1470, the positioning node can determine positioning assistance data based on the respective action reports received from the RAN nodes (e.g., in block 1460). The positioning assistance data can include indications of active PRS associated with each of the TRPs. In block 1480, the positioning node can broadcast, via the one or more RAN nodes, the positioning assistance data in at least one cell of the RAN. In some embodiments, the positioning assistance data broadcast in each cell can include an indication that the RAN node serving the cell is capable of on-demand activation of PRS in the cell.

In some embodiments, each PRS activity report includes a list of PRS resource sets that can be configured by the RAN node or TRPs associated with the RAN node.

In some of these embodiments, each PRS activity report can also include the following associated with each particular one of the PRS resource sets in the list:

identifiers of PRS resources within the particular PRS resource set; and one or more of the following associated with each particular one of the PRS resources:

a number of UEs that have reported reference signal receive power (RSRP) above a threshold for the particular PRS resource, average reported RSRP for the particular PRS resource, average reported reference signal received quality (RSRQ) for the particular PRS resource, and any quasi-colocation (QCL) relationships for the particular PRS resource.

An example of such embodiments is shown in Table 2, above.

In other of these embodiments, each PRS activity report can also include the following associated with each particular one of the PRS resource sets in the list:

a number of UEs that have reported reference signal receive power (RSRP) above a threshold for the particular PRS resource set, average reported RSRP for the particular PRS resource set, average reported reference signal received quality (RSRQ) for the particular PRS resource set, and any QCL relationships for the particular PRS resource set.

These embodiments are exemplified by the aggregated report discussed above.

In addition, FIG. 15 shows a flow diagram of an exemplary method (e.g., procedure) for a RAN node associated with one or more TRPs, according to various embodiments of the present disclosure. The exemplary method can be performed by a RAN node (e.g., base station, eNB, gNB, ng-eNB, etc. or component thereof) such as described elsewhere herein.

The exemplary method can include the operations of block 1520, where the RAN node can receive, from a positioning node associated with the RAN, one or more PRS activity reports that include information about measurements made by a plurality of UEs on PRS transmitted by TRPs associated with the RAN node. The exemplary method can also include the operations of block 1540, where the RAN node can determine updated PRS transmission configurations for the associated TRPs based on the one or more received PRS activity reports.

In some embodiments, the exemplary method can also include the operations of block 1510, where the RAN node can send, to the positioning node, a request for PRS activity reporting. The one or more PRS activity reports can be received (e.g., in block 1520) in response to the request. An example is shown in FIG. 12.

In some embodiments, the exemplary method can also include the operations of block 1530, where the RAN node can send, to the positioning node, respective acknowledgements of the received PRS activity reports. An example is shown in FIG. 11.

In some embodiments, the receiving operations of block 1520 can include the operations of sub-block 1521, where the RAN node can comprises receive periodic PRS activity reports from the positioning node. Each periodic PRS activity report is based on updated UE measurements received by the positioning node before sending the periodic PRS activity report. In some embodiments, receiving the periodic PRS activity reports can be responsive to one of the following: a single request from the RAN node for PRS activity reports; or a configuration by an OAM function associated with the RAN. In some embodiments, only a particular number of periodic PRS activity reports are received, with the particular number being based on one of the following: a predetermined or configured number; or a period of the periodic PRS activity reports (e.g., X discussed above) and a predetermined or configured reporting duration.

In some embodiments, the exemplary method can also include the operations of block 1430, where the RAN node can send, to the positioning node, an action report indicating the updated PRS transmission configurations for the associated TRPs. An example is shown in FIG. 13. In such embodiments, each of the updated PRS transmission configurations indicates one or more PRS that has been activated or deactivated responsive to a PRS activity report from the positioning node.

In some of these embodiments, the determining operations of block 1540 can include the operations of sub-blocks 1541-1543. In sub-block 1541, the RAN node can determine whether to deactivate any of the PRS associated with the measurements (e.g., indicated in the PRS activity report(s) received in block 1520). In sub-block 1542, the RAN node can determine whether to activate transmission of other PRS (i.e., other than the PRS associated with the measurements) by the associated TRPs. This can also be based on the PRS activity report(s). In sub-block 1543, the RAN node can activate or deactivate PRS transmissions in accordance with the determinations (i.e., in sub-blocks 1541-1542).

In some of these embodiments, the exemplary method can also include the operations of block 1560, where the RAN node can receive, from the positioning node in response to the action report, assistance data for broadcast in a cell served by the RAN node. The positioning assistance data can include indications of active PRS transmissions by one or more of the TRPs associated with the RAN node. The assistance data can include some or all of the PRS transmissions indicated as newly-activated in the activity report (e.g., sent in block 1550). Optionally, the RAN node can broadcast the received positioning assistance data.

In some embodiments, each PRS activity report (e.g., sent in block 1520) can include a list of PRS resource sets that can be configured by the RAN node or by TRPs associated with the RAN node.

In some of these embodiments, each PRS activity report can also include the following information associated with each PRS resource set in the list:

identifiers of PRS resources within the PRS resource set; and one or more of the following associated with each of the PRS resources:

a number of UEs that have reported RSRP above a threshold for the PRS resource, average reported RSRP for the PRS resource, average reported RSRQ for the PRS resource, and any QCL relationships for the PRS resource.

An example of such embodiments is shown in Table 2, above.

In other of these embodiments, each PRS activity report can also include the following information associated with each PRS resource set in the list:

a number of UEs that have reported RSRP above a threshold for the PRS resource set, average reported RSRP for the PRS resource set, average reported RSRQ for the PRS resource set, and any QCL relationships for the PRS resource set.

These embodiments are exemplified by the aggregated report discussed above.

In addition, FIG. 16 shows a flow diagram of an exemplary method (e.g., procedure) for a UE configured for positioning in a RAN, according to various embodiments of the present disclosure. The exemplary method can be performed by a UE (e.g., wireless device, etc.) such as described elsewhere herein.

The exemplary method can include the operations of block 1610, where the UE can send, to a positioning node associated with the RAN, a report of measurements made by the UE on first beams transmitted by a plurality of TRPs in the RAN. The exemplary method can also include the operations of block 1630, where the UE can receive, from one or more of the TRPs, PRS via one or more second beams that meet one of the following criteria:

are first beams whose reported measurements were above one or more thresholds; or have QCL relations with first beams whose reported measurements were above one or more thresholds.

In some embodiments, the exemplary method can also include the operations of block 1620, where the UE can receive positioning assistance data broadcast by a RAN node. In such case, receiving the PRS via the one or more second beams in block 1630 is based on the positioning assistance data received in block 1620. In some of these embodiments, the positioning assistance data includes one or more of the following:

indications of active PRS associated with each of the TRPs, wherein the active PRS includes the PRS received via the second beams; and an indication of whether on-demand PRS activation has been enabled or disabled by the RAN node.

In some variants, the exemplary method can also include the operations of block 1640, where when the indication indicates that on-demand PRS activation has been enabled, the UE can determine that PRS have been deactivated on one or more of the first beams based on detecting no signal on the one or more first beams.

In some embodiments, each measurement in the report is associated with a particular PRS resource within a particular PRS resource set transmitted by a particular one of the TRPs. Also, each measurement in the report is of one of the following parameters: RSRP for the particular PRS resource, or RSRQ for the particular PRS resource.

Although various embodiments are described above in terms of methods, techniques, and/or procedures, the person of ordinary skill will readily comprehend that such methods, techniques, and/or procedures can be embodied by various combinations of hardware and software in various systems, communication devices, computing devices, control devices, apparatuses, non-transitory computer-readable media, computer program products, etc.

Figure 17:
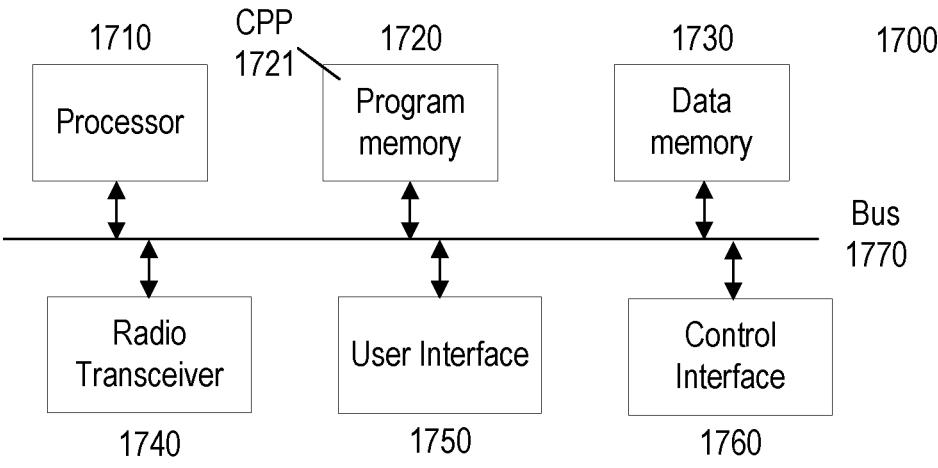
FIG. 17 is a block diagram of an exemplary wireless device or UE according to various embodiments of the present disclosure.

FIG. 17 shows a block diagram of an exemplary wireless device or user equipment (UE) 1700 (hereinafter referred to as "UE 1700") according to various embodiments of the present disclosure, including those described above with reference to other figures. For example, UE 1700 can be configured by execution of instructions, stored on a computer-readable medium, to perform operations corresponding to one or more of the exemplary methods described herein.

UE 1700 can include a processor 1710 (also referred to as "processing circuitry") that can be operably connected to a program memory 1720 and/or a data memory 1730 via a bus 1770 that can comprise parallel address and data buses, serial ports, or other methods and/or structures known to those of ordinary skill in the art. Program memory 1720 can store software code, programs, and/or instructions (collectively shown as computer program product 1721 in FIG. 17) that, when executed by processor 1710, can configure and/or facilitate UE 1700 to perform various operations, including operations corresponding to various exemplary methods described herein. As part of or in addition to such operations, execution of such instructions can configure and/or facilitate UE 1700 to communicate using one or more wired or wireless communication protocols, including one or more wireless communication protocols standardized by 3GPP, 3GPP2, or IEEE, such as those commonly known as 5G/NR, LTE, LTE-A, UMTS, HSPA, GSM, GPRS, EDGE, 1×RTT, CDMA2000, 802.11 WiFi, HDMI, USB, Firewire, etc., or any other current or future protocols that can be utilized in conjunction with radio transceiver 1740, user interface 1750, and/or control interface 1760.

As another example, processor 1710 can execute program code stored in program memory 1720 that corresponds to MAC, RLC, PDCP, and RRC layer protocols standardized by 3GPP (e.g., for NR and/or LTE). As a further example, processor 1710 can execute program code stored in program memory 1720 that, together with radio transceiver 1740, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA). As another example, processor 1710 can execute program code stored in program memory 1720 that, together with radio transceiver 1740, implements device-to-device (D2D) communications with other compatible devices and/or UEs.

Program memory 1720 can also include software code executed by processor 1710 to control the functions of UE 1700, including configuring and controlling various components such as radio transceiver 1740, user interface 1750, and/or control interface 1760. Program memory 1720 can also comprise one or more application programs and/or modules comprising computer-executable instructions embodying any of the exemplary methods described herein. Such software code can be specified or written using any known or future developed programming language, such as e.g., Java, C++, C, Objective C, HTML, XHTML, machine code, and Assembler, as long as the desired functionality, e.g., as defined by the implemented method steps, is preserved. In addition, or as an alternative, program memory 1720 can comprise an external storage arrangement (not shown) remote from UE 1700, from which the instructions can be downloaded into program memory 1720 located within or removably coupled to UE 1700, so as to enable execution of such instructions.

Data memory 1730 can include memory area for processor 1710 to store variables used in protocols, configuration, control, and other functions of UE 1700, including operations corresponding to, or comprising, any of the exemplary methods described herein. Moreover, program memory 1720 and/or data memory 1730 can include non-volatile memory (e.g., flash memory), volatile memory (e.g., static or dynamic RAM), or a combination thereof. Furthermore, data memory 1730 can comprise a memory slot by which removable memory cards in one or more formats (e.g., SD Card, Memory Stick, Compact Flash, etc.) can be inserted and removed.

Persons of ordinary skill will recognize that processor 1710 can include multiple individual processors (including, e.g., multi-core processors), each of which implements a portion of the functionality described above. In such cases, multiple individual processors can be commonly connected to program memory 1720 and data memory 1730 or individually connected to multiple individual program memories and or data memories. More generally, persons of ordinary skill in the art will recognize that various protocols and other functions of UE 1700 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware.

Radio transceiver 1740 can include radio-frequency transmitter and/or receiver functionality that facilitates the UE 1700 to communicate with other equipment supporting like wireless communication standards and/or protocols. In some embodiments, the radio transceiver 1740 includes one or more transmitters and one or more receivers that enable UE 1700 to communicate according to various protocols and/or methods proposed for standardization by 3GPP and/or other standards-setting organizations (SSOs). For example, such functionality can operate cooperatively with processor 1710 to implement a PHY layer based on OFDM, OFDMA, and/or SC-FDMA technologies, such as described herein with respect to other figures.

In some embodiments, radio transceiver 1740 includes one or more transmitters and one or more receivers that can facilitate the UE 1700 to communicate with various LTE, LTE-Advanced (LTE-A), and/or NR networks according to standards promulgated by 3GPP. In some embodiments of the present disclosure, the radio transceiver 1740 includes circuitry, firmware, etc. necessary for the UE 1700 to communicate with various NR, NR-U, LTE, LTE-A, LTE-LAA, UMTS, and/or GSM/EDGE networks, also according to 3GPP standards. In some embodiments, radio transceiver 1740 can include circuitry supporting D2D communications between UE 1700 and other compatible devices.

In some embodiments, radio transceiver 1740 includes circuitry, firmware, etc. necessary for the UE 1700 to communicate with various CDMA2000 networks, according to 3GPP2 standards. In some embodiments, the radio transceiver 1740 can be capable of communicating using radio technologies that operate in unlicensed frequency bands, such as IEEE 802.11 WiFi that operates using frequencies in the regions of 2.4, 5.6, and/or 60 GHz. In some embodiments, radio transceiver 1740 can include a transceiver that is capable of wired communication, such as by using IEEE 802.3 Ethernet technology. The functionality particular to each of these embodiments can be coupled with and/or controlled by other circuitry in the UE 1700, such as the processor 1710 executing program code stored in program memory 1720 in conjunction with, and/or supported by, data memory 1730.

User interface 1750 can take various forms depending on the particular embodiment of UE 1700, or can be absent from UE 1700 entirely. In some embodiments, user interface 1750 can comprise a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 1700 can comprise a tablet computing device including a larger touchscreen display. In such embodiments, one or more of the mechanical features of the user interface 1750 can be replaced by comparable or functionally equivalent virtual user interface features (e.g., virtual keypad, virtual buttons, etc.) implemented using the touchscreen display, as familiar to persons of ordinary skill in the art. In other embodiments, the UE 1700 can be a digital computing device, such as a laptop computer, desktop computer, workstation, etc. that comprises a mechanical keyboard that can be integrated, detached, or detachable depending on the particular embodiment. Such a digital computing device can also comprise a touch screen display. Many embodiments of the UE 1700 having a touch screen display are capable of receiving user inputs, such as inputs related to exemplary methods described herein or otherwise known to persons of ordinary skill.

In some embodiments, UE 1700 can include an orientation sensor, which can be used in various ways by features and functions of UE 1700. For example, the UE 1700 can use outputs of the orientation sensor to determine when a user has changed the physical orientation of the UE 1700's touch screen display. An indication signal from the orientation sensor can be available to any application program executing on the UE 1700, such that an application program can change the orientation of a screen display (e.g., from portrait to landscape) automatically when the indication signal indicates an approximate 90-degree change in physical orientation of the device. In this exemplary manner, the application program can maintain the screen display in a manner that is readable by the user, regardless of the physical orientation of the device. In addition, the output of the orientation sensor can be used in conjunction with various embodiments of the present disclosure.

A control interface 1760 of the UE 1700 can take various forms depending on the particular embodiment of UE 1700 and of the particular interface requirements of other devices that the UE 1700 is intended to communicate with and/or control. For example, the control interface 1760 can comprise an RS-232 interface, a USB interface, an HDMI interface, a Bluetooth interface, an IEEE ("Firewire") interface, an I²C interface, a PCMCIA interface, or the like. In some embodiments of the present disclosure, control interface 1760 can comprise an IEEE 802.3 Ethernet interface such as described above. In some embodiments of the present disclosure, the control interface 1760 can comprise analog interface circuitry including, for example, one or more digital-to-analog converters (DACs) and/or analog-to-digital converters (ADCs).

Persons of ordinary skill in the art can recognize the above list of features, interfaces, and radio-frequency communication standards is merely exemplary, and not limiting to the scope of the present disclosure. In other words, the UE 1700 can comprise more functionality than is shown in FIG. 17 including, for example, a video and/or still-image camera, microphone, media player and/or recorder, etc. Moreover, radio transceiver 1740 can include circuitry necessary to communicate using additional radio-frequency communication standards including Bluetooth, GPS, and/or others. Moreover, the processor 1710 can execute software code stored in the program memory 1720 to control such additional functionality. For example, directional velocity and/or position estimates output from a GPS receiver can be available to any application program executing on the UE 1700, including any program code corresponding to and/or embodying any embodiments (e.g., of methods) described herein.

Figure 18:
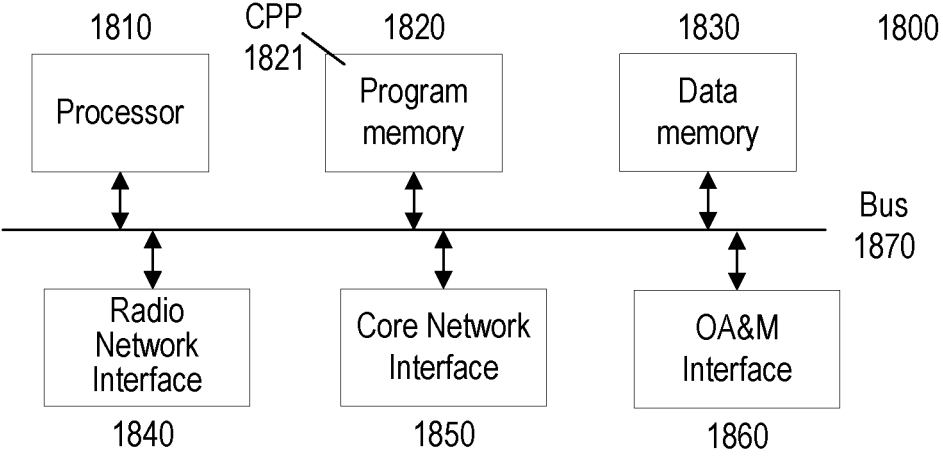
FIG. 18 is a block diagram of an exemplary network node according to various embodiments of the present disclosure.

FIG. 18 shows a block diagram of an exemplary network node 1800 according to various embodiments of the present disclosure, including those described above with reference to other figures. For example, exemplary network node 1800 can be configured by execution of instructions, stored on a computer-readable medium, to perform operations corresponding to one or more of the exemplary methods described herein. In some embodiments, network node 1800 can comprise a base station, eNB, gNB, or one or more components thereof. For example, network node 1800 can be configured as a central unit (CU) and one or more distributed units (DUs) according to NR gNB architectures specified by 3GPP. More generally, the functionally of network node 1800 can be distributed across various physical devices and/or functional units, modules, etc.

Network node 1800 can include processor 1810 (also referred to as "processing circuitry") that is operably connected to program memory 1820 and data memory 1830 via bus 1870, which can include parallel address and data buses, serial ports, or other methods and/or structures known to those of ordinary skill in the art.

Program memory 1820 can store software code, programs, and/or instructions (collectively shown as computer program product 1821 in FIG. 18) that, when executed by processor 1810, can configure and/or facilitate network node 1800 to perform various operations, including operations corresponding to various exemplary methods described herein. As part of and/or in addition to such operations, program memory 1820 can also include software code executed by processor 1810 that can configure and/or facilitate network node 1800 to communicate with one or more other UEs or network nodes using other protocols or protocol layers, such as one or more of the PHY, MAC, RLC, PDCP, and RRC layer protocols standardized by 3GPP for LTE, LTE-A, and/or NR, or any other higher-layer (e.g., NAS) protocols utilized in conjunction with radio network interface 1840 and/or core network interface 1850 (which can be referred to collectively as "communication interface"). For example, core network interface 1850 can comprise the S1 or NG interface and radio network interface 1840 can comprise the Uu interface, as standardized by 3GPP. Program memory 1820 can also comprise software code executed by processor 1810 to control the functions of network node 1800, including configuring and controlling various components such as radio network interface 1840 and core network interface 1850.

Data memory 1830 can comprise memory area for processor 1810 to store variables used in protocols, configuration, control, and other functions of network node 1800. As such, program memory 1820 and data memory 1830 can comprise non-volatile memory (e.g., flash memory, hard disk, etc.), volatile memory (e.g., static or dynamic RAM), network-based (e.g., "cloud") storage, or a combination thereof. Persons of ordinary skill in the art will recognize that processor 1810 can include multiple individual processors (not shown), each of which implements a portion of the functionality described above. In such case, multiple individual processors may be commonly connected to program memory 1820 and data memory 1830 or individually connected to multiple individual program memories and/or data memories. More generally, persons of ordinary skill will recognize that various protocols and other functions of network node 1800 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio network interface 1840 can comprise transmitters, receivers, signal processors, ASICs, antennas, beamforming units, and other circuitry that enables network node 1800 to communicate with other equipment such as, in some embodiments, a plurality of compatible user equipment (UE). In some embodiments, interface 1840 can also enable network node 1800 to communicate with compatible satellites of a satellite communication network. In some embodiments, radio network interface 1840 can comprise various protocols or protocol layers, such as the PHY, MAC, RLC, PDCP, and/or RRC layer protocols standardized by 3GPP for LTE, LTE-A, LTE-LAA, NR, NR-U, etc.; improvements thereto such as described herein above; or any other higher-layer protocols utilized in conjunction with radio network interface 1840. According to further embodiments of the present disclosure, the radio network interface 1840 can comprise a PHY layer based on OFDM, OFDMA, and/or SC-FDMA technologies. In some embodiments, the functionality of such a PHY layer can be provided cooperatively by radio network interface 1840 and processor 1810 (including program code in memory 1820).

Core network interface 1850 can comprise transmitters, receivers, and other circuitry that enables network node 1800 to communicate with other equipment in a core network such as, in some embodiments, circuit-switched (CS) and/or packet-switched Core (PS) networks. In some embodiments, core network interface 1850 can comprise the S1 interface standardized by 3GPP. In some embodiments, core network interface 1850 can comprise the NG interface standardized by 3GPP. In some embodiments, core network interface 1850 can comprise one or more interfaces to one or more AMFs, SMFs, SGWs, MMEs, SGSNs, GGSNs, and other physical devices that comprise functionality found in GERAN, UTRAN, EPC, 5GC, and CDMA2000 core networks that are known to persons of ordinary skill in the art. In some embodiments, these one or more interfaces may be multiplexed together on a single physical interface. In some embodiments, lower layers of core network interface 1850 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

In some embodiments, network node 1800 can include hardware and/or software that configures and/or facilitates network node 1800 to communicate with other network nodes in a RAN (also referred to as a "wireless network"), such as with other eNBs, gNBs, ng-eNBs, en-gNBs, IAB nodes, CUs, DUs, etc. Such hardware and/or software can be part of radio network interface 1840 and/or core network interface 1850, or it can be a separate functional unit (not shown). For example, such hardware and/or software can configure and/or facilitate network node 1800 to communicate with other RAN nodes via the X2, Xn, and/or F1 interfaces standardized by 3GPP.

OA&M interface 1860 can comprise transmitters, receivers, and other circuitry that enables network node 1800 to communicate with external networks, computers, databases, and the like for purposes of operations, administration, and maintenance of network node 1800 or other network equipment operably connected thereto. Lower layers of OA&M interface 1860 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art. Moreover, in some embodiments, one or more of radio network interface 1840, core network interface 1850, and OA&M interface 1860 may be multiplexed together on a single physical interface, such as the examples listed above.

Figure 19:
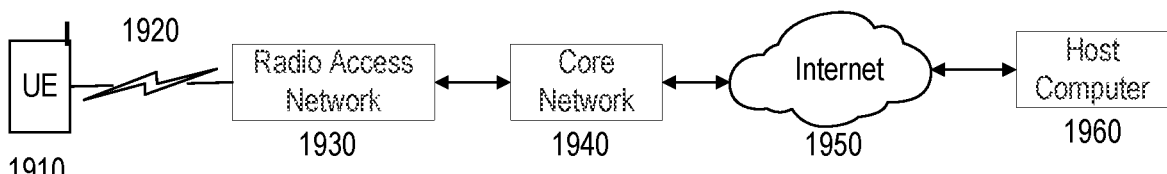
FIG. 19 is a block diagram of an exemplary network configured to provide over-the-top (OTT) data services between a host computer and a UE, according to various embodiments of the present disclosure.

FIG. 19 is a block diagram of an exemplary communication network configured to provide over-the-top (OTT) data services between a host computer and a user equipment (UE), according to various embodiments of the present disclosure. UE 1910 can communicate with radio access network (RAN, also referred to as "wireless network") 1930 over radio interface 1920, which can be based on protocols described above including, e.g., LTE, LTE-A, and 5G/NR. For example, UE 1910 can be configured and/or arranged as shown in other figures discussed above.

RAN 1930 can include one or more terrestrial network nodes (e.g., base stations, eNBs, gNBs, controllers, etc.) operable in licensed spectrum bands, as well one or more network nodes operable in unlicensed spectrum (using, e.g., LAA or NR-U technology), such as a 2.4-GHz band and/or a 5-GHz band. In such cases, the network nodes comprising RAN 1930 can cooperatively operate using licensed and unlicensed spectrum. In some embodiments, RAN 1930 can include, or be capable of communication with, one or more satellites comprising a satellite access network.

RAN 1930 can further communicate with core network 1940 according to various protocols and interfaces described above. For example, one or more apparatus (e.g., base stations, eNBs, gNBs, etc.) comprising RAN 1930 can communicate to core network 1940 via core network interface 1950 described above. In some embodiments, RAN 1930 and core network 1940 can be configured and/or arranged as shown in other figures discussed above. For example, eNBs comprising an E-UTRAN 1930 can communicate with an EPC core network 1940 via an S1 interface. As another example, gNBs and ng-eNBs comprising an NG-RAN 1930 can communicate with a 5GC core network 1930 via an NG interface.

Core network 1940 can further communicate with an external packet data network, illustrated in FIG. 19 as Internet 1950, according to various protocols and interfaces known to persons of ordinary skill in the art. Many other devices and/or networks can also connect to and communicate via Internet 1950, such as exemplary host computer 1960. In some embodiments, host computer 1960 can communicate with UE 1910 using Internet 1950, core network 1940, and RAN 1930 as intermediaries. Host computer 1960 can be a server (e.g., an application server) under ownership and/or control of a service provider. Host computer 1960 can be operated by the OTT service provider or by another entity on the service provider's behalf.

For example, host computer 1960 can provide an over-the-top (OTT) packet data service to UE 1910 using facilities of core network 1940 and RAN 1930, which can be unaware of the routing of an outgoing/incoming communication to/from host computer 1960. Similarly, host computer 1960 can be unaware of routing of a transmission from the host computer to the UE, e.g., the routing of the transmission through RAN 1930. Various OTT services can be provided using the exemplary configuration shown in FIG. 19 including, e.g., streaming (unidirectional) audio and/or video from host computer to UE, interactive (bidirectional) audio and/or video between host computer and UE, interactive messaging or social communication, interactive virtual or augmented reality, etc.

The exemplary network shown in FIG. 19 can also include measurement procedures and/or sensors that monitor network performance metrics including data rate, latency and other factors that are improved by embodiments disclosed herein. The exemplary network can also include functionality for reconfiguring the link between the endpoints (e.g., host computer and UE) in response to variations in the measurement results. Such procedures and functionalities are known and practiced; if the network hides or abstracts the radio interface from the OTT service provider, measurements can be facilitated by proprietary signaling between the UE and the host computer.

The embodiments described herein can reduce signaling overhead by aggregating PRS measurements by multiple UEs into a single report to a particular RAN node. Furthermore, such techniques can be transparent to UEs and do not impact UE implementation or require standardization of new UE procedures (e.g., in RRC). As such, legacy UEs can also benefit. In addition, such techniques reduce PRS transmission overhead, energy consumption, and interference, since PRS activity reports include information that enables RAN nodes to selectively transmit PRS beams only to coverage areas with UEs needing such beams and to turn off PRS beams in other coverage areas. When used in NR UEs (e.g., UE 1910) and gNBs (e.g., gNBs comprising RAN 1930), embodiments described herein can provide various improvements, benefits, and/or advantages that facilitate the use of location-based OTT services. As a consequence, this improves the performance of these services as experienced by OTT service providers and end-users, including more precise delivery of services with lower latency without excessive UE energy consumption or other reductions in user experience.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification and drawings, can be used synonymously in certain instances (e.g., "data" and "information"). It should be understood, that although these terms (and/or other terms that can be synonymous to one another) can be used synonymously herein, there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Embodiments of the techniques and apparatus described herein also include, but are not limited to, the following enumerated examples:

A1. A method for a positioning node associated with a radio access network (RAN), the method comprising:
receiving, from a plurality of user equipment (UEs), measurements made by the respective UEs on positioning reference signals (PRS) transmitted by a plurality of transmission reception points (TRPs) in the RAN; and
sending, to one or more RAN nodes, respective PRS activity reports that include information about measurements made by the UEs on PRS transmitted by TRPs associated with the respective RAN nodes.

A2. The method of embodiment A1, further comprising receiving, from the RAN nodes, respective requests for PRS activity reporting, wherein the respective PRS activity reports are sent in response to the respective requests.

A3. The method of embodiment A1, further comprising receiving, from the RAN nodes, respective acknowledgements of the respective PRS activity reports.

A4. The method of any of embodiments A1-A3, wherein:
the method further comprises subsequently receiving, from the plurality of UEs, updated measurements made by the UEs on PRS transmitted by the plurality of TRPs, and
sending respective PRS activity reports comprises sending periodic PRS activity reports to each of the one or more RAN nodes; and
each periodic PRS activity report is based on updated measurements received by the positioning node before sending the periodic PRS activity report.

A5. The method of embodiment A4, wherein sending the periodic PRS activity reports is responsive to one of the following:
a single request, from each of the RAN nodes, for PRS activity reports; or
a configuration received from an operations/administration/maintenance (OAM) function associated with the RAN.

A6. The method of any of embodiments A4-A5, wherein:
sending respective PRS activity reports comprises stopping the sending after a particular number of periodic PRS activity reports is sent to each of the RAN nodes; and
the particular number is based on one of the following:
a predetermined or configured number; or
a period of the periodic PRS activity reports and a predetermined or configured reporting duration.

A7. The method of any of embodiments A1-A6, further comprising receiving, from the RAN nodes, respective action reports indicating updated PRS transmission configurations for TRPs associated with the respective RAN nodes.

A8. The method of embodiment A7, wherein each of the updated PRS transmission configurations indicates one or more PRS that has been activated or deactivated responsive to a PRS activity report from the positioning node.

A9. The method of any of embodiments A7-A8, further comprising:
determining positioning assistance data based on the respective action reports received from the RAN nodes, wherein the positioning assistance data includes indications of active PRS associated with each of the TRPs; and
broadcasting, via the RAN nodes, the positioning assistance data in at least one cell of the RAN.

A10. The method of embodiment A9, wherein the positioning assistance data, broadcast in each cell, includes an indication that the RAN node serving the cell is capable of dynamic activation of PRS in the cell.

A11. The method of any of embodiments A1-A10, wherein each PRS activity report includes a list of PRS resource sets that can be configured by the RAN node or TRPs associated with the RAN node.

A12. The method of embodiment A11, wherein each PRS activity report also includes the following information associated with each PRS resource set in the list:
identifiers of PRS resources within the PRS resource set; and
one or more of the following associated with each of the PRS resources:

a number of UEs that have reported reference signal receive power (RSRP) above a threshold for the PRS resource, average reported RSRP for the PRS resource, average reported reference signal received quality (RSRQ) for the PRS resource, any quasi-colocation (QCL) relationships for the PRS resource.

A13. The method of embodiment A11, wherein each PRS activity report also includes the following information associated with each PRS resource set in the list:

a number of UEs that have reported reference signal receive power (RSRP) above a threshold for the PRS resource set, average reported RSRP for the PRS resource set, average reported reference signal received quality (RSRQ) for the PRS resource set, and any quasi-colocation (QCL) relationships for the PRS resource set.

B1. A method for a radio access network (RAN) node associated with one or more transmission reception points (TRPs), the method comprising:

receiving, from a positioning node associated with the RAN, one or more PRS activity reports that include information about measurements made by a plurality of user equipment (UEs) on positioning reference signals (PRS) transmitted by TRPs associated with the RAN node; and determining updated PRS transmission configurations for the associated TRPs based on the one or more received PRS activity reports.

B2. The method of embodiment B1, further comprising sending, to the positioning node, a request for PRS activity reporting, wherein the one or more PRS activity reports are received in response to the request.

B3. The method of embodiment B1, further comprising sending, to the positioning node, respective acknowledgements of the received PRS activity reports.

B4. The method of any of embodiments B1-B3, wherein:

receiving one or more PRS activity reports comprises receiving periodic PRS activity reports from the positioning node; and each periodic PRS activity report is based on updated UE measurements received by the positioning node before sending the periodic PRS activity report.

B5. The method of any of embodiment B4, wherein receiving the periodic PRS activity reports is responsive to one of the following:

a single request from the RAN node for PRS activity reports; or a configuration by an operations/administration/maintenance (OAM) function associated with the RAN.

B6. The method of any of embodiments B4-B5, wherein:

only a particular number of periodic PRS activity reports are received; and the particular number is based on one of the following:

a predetermined or configured number; or a period of the periodic PRS activity reports and a predetermined or configured reporting duration.

B7. The method of any of embodiments B1-B6, further comprising sending, to the positioning node, an action report indicating the updated PRS transmission configurations for the associated TRPs.

B8. The method of embodiment B7, wherein determining updated PRS transmission configurations comprises:

determining whether to deactivate any of the PRS associated with the measurements; and determining whether to activate transmission of other PRS by the associated TRPs; and activating or deactivating PRS transmissions in accordance with the determinations.

B9. The method of any of embodiments B7-B8, wherein each of the updated PRS transmission configurations indicates one or more PRS that has been activated or deactivated responsive to the one or more received PRS activity reports.

B10. The method of any of embodiments B1-B, further comprising:

receiving, from the positioning node in response to the action report, assistance data for broadcast in a cell served by the RAN node;

the positioning assistance data includes indications of active PRS transmissions by one or more of the TRPs associated with the RAN node.

B11. The method of embodiment B10, wherein the positioning assistance data includes an indication that the RAN node is capable of dynamic activation of PRS in the cell.

B12. The method of any of embodiments B1-B11, wherein each PRS activity report includes a list of PRS resource sets that can be configured by the RAN node or TRPs associated with the RAN node.

B13. The method of embodiment B12, wherein each PRS activity report also includes the following information associated with each PRS resource set in the list:

identifiers of PRS resources within the PRS resource set; and one or more of the following associated with each of the PRS resources:

a number of UEs that have reported reference signal receive power (RSRP) above a threshold for the PRS resource, average reported RSRP for the PRS resource, average reported reference signal received quality (RSRQ) for the PRS resource, any quasi-colocation (QCL) relationships for the PRS resource.

B14. The method of embodiment Eli, wherein each PRS activity report also includes the following information associated with each PRS resource set in the list:

a number of UEs that have reported reference signal receive power (RSRP) above a threshold for the PRS resource set, average reported RSRP for the PRS resource set, average reported reference signal received quality (RSRQ) for the PRS resource set, and any quasi-colocation (QCL) relationships for the PRS resource set.

C1. A positioning node associated with a radio access network (RAN), the positioning node comprising:

communication interface circuitry configured to communicate with RAN nodes and with user equipment (UEs) via the RAN nodes; and processing circuitry operatively coupled to the communication interface circuitry, whereby the processing circuitry and the communication interface circuitry are configured to perform operations corresponding to any of the methods of embodiments A1-A13.

C2. A positioning node associated with a radio access network (RAN), the positioning node being further configured to perform operations corresponding to any of the methods of embodiments A1-A13.

C3. A non-transitory, computer-readable medium storing computer-executable instructions that, when executed by processing circuitry of a positioning node associated with a radio access network (RAN), configure the positioning node to perform operations corresponding to any of the methods of embodiments A1-A13.

C4. A computer program product comprising computer-executable instructions that, when executed by processing circuitry of a positioning node associated with a radio access network (RAN), configure the positioning node to perform operations corresponding to any of the methods of embodiments A1-A13.

D1. A radio access network (RAN) node associated with one or more transmission reception points (TRPs), the RAN node comprising:

communication interface circuitry configured to communicate with a positioning node and to transmit positioning reference signals via the TRPs; and processing circuitry operatively coupled to the communication interface circuitry, whereby the processing circuitry and the communication interface circuitry are configured to perform operations corresponding to any of the methods of embodiments B1-B14.

D2. A radio access network (RAN) node associated with one or more transmission reception points (TRPs), the RAN node being further configured to perform operations corresponding to any of the methods of embodiments B1-B14.

D3. A non-transitory, computer-readable medium storing computer-executable instructions that, when executed by processing circuitry of a radio access network (RAN) node associated with one or more transmission reception points (TRPs), configure the RAN node to perform operations corresponding to any of the methods of embodiments B1-B14.

D4. A computer program product comprising computer-executable instructions that, when executed by processing circuitry of a radio access network (RAN) node associated with one or more transmission reception points (TRPs), configure the RAN node to perform operations corresponding to any of the methods of embodiments B1-B14.

The invention claimed is:

1. A method for a positioning node that is external to but communicatively coupled with a radio access network (RAN), the method comprising:

receiving, from a plurality of user equipment (UEs) via one or more of a plurality of RAN nodes, measurements made by the respective UEs on positioning reference signals (PRS) transmitted by a plurality of transmission reception points (TRPs), with each TRP being associated with one of the plurality of RAN nodes; and sending, to the plurality of RAN nodes, respective PRS activity reports that include information about measurements made by the UEs on PRS transmitted by TRPs associated with the respective RAN nodes, wherein each PRS activity report also includes one or more of the following sets of information associated with each particular one of the PRS resource sets in the list:

a first set of information including:

identifiers of PRS resources within the particular PRS resource set; and one or more of the following associated with each particular one of the PRS resources within the particular PRS resource set:

a number of UEs that have reported reference signal received power RSRP) above a threshold for the particular PRS resource, average reported RSRP for the particular PRS resource, average reported reference signal received quality (RSRQ) for the particular PRS resource, and any quasi-colocation (QCL) relationships for the particular PRS resource; and a second set of information including:

a number of UEs that have reported reference signal received power (RSRP) above a threshold for the particular PRS resource set, average reported RSRP for the particular PRS resource set, average reported reference signal received quality (RSRQ) for the particular PRS resource set, and any quasi-colocation (QCL) relationships for the particular PRS resource set.

2. The method of claim 1, wherein:

the method further comprises receiving, from the plurality of UEs, updated measurements made by the UEs on PRS transmitted by the plurality of TRPs;

sending respective PRS activity reports comprises sending periodic PRS activity reports to each of the plurality of RAN nodes; and each periodic PRS activity report is based on updated measurements received by the positioning node before sending the periodic PRS activity report.

3. The method of claim 2, wherein one or more of the following applies:

sending the periodic PRS activity reports is based on one of the following:

a single request, from each of the plurality of RAN nodes, for PRS activity reports; or a configuration received from an operations/administration/maintenance (OAM) function associated with the RAN; and sending the periodic PRS activity reports comprises stopping the sending after a particular number of periodic PRS activity reports is sent to each of the RAN nodes, wherein the particular number is based on one of the following:

a predetermined or configured number; or a period of the periodic PRS activity reports and a predetermined or configured reporting duration.

4. The method of claim 2, further comprising:

determining positioning assistance data based on the respective action reports received from the plurality of RAN nodes, wherein the positioning assistance data includes indications of active PRS associated with each of the TRPs; and broadcasting, via the plurality of RAN nodes, the positioning assistance data in at least one cell of the RAN.

5. The method of claim 4, wherein the positioning assistance data broadcast in each cell includes an indication that the RAN node serving the cell is capable of on-demand activation of PRS in the cell.

6. The method of claim 1, wherein:

the method further comprises receiving, from the plurality of RAN nodes, respective action reports indicating updated PRS transmission configurations for TRPs associated with the respective RAN nodes; and each of the updated PRS transmission configurations indicates one or more PRS that has been activated or deactivated responsive to a PRS activity report from the positioning node.

7. The method of claim 1, wherein one or more of the following applies:

each PRS activity report includes a list of PRS resource sets that can be configured by the RAN node or by TRPs associated with the RAN node; and the information included in the PRS activity report is on beam-level or is aggregated to a resource set level.

8. A method for a radio access network (RAN) node associated with one or more transmission reception points (TRPs), the method comprising:

receiving, from a positioning node external to the RAN, one or more PRS activity reports that include information about measurements made by a plurality of user equipment (UEs) on positioning reference signals (PRS) transmitted by TRPs associated with the RAN node; and determining updated PRS transmission configurations for the associated TRPs based on the one or more received PRS activity reports, wherein each PRS activity report also includes one or more of the following sets of information associated with each particular one of the PRS resource sets in the list:

a first set of information including:

identifiers of PRS resources within the particular PRS resource set; and one or more of the following associated with each particular one of the PRS resources within the particular PRS resource set:

a number of UEs that have reported reference signal received power (RSRP) above a threshold for the particular PRS resource, average reported RSRP for the particular PRS resource, average reported reference signal received quality (RSRQ) for the particular PRS resource, and any quasi-colocation (QCL) relationships for the particular PRS resource; and a second set of information including:

a number of UEs that have reported reference signal received power (RSRP) above a threshold for the particular PRS resource set, average reported RSRP for the particular PRS resource set, average reported reference signal received quality (RSRQ) for the particular PRS resource set, and any quasi-colocation (QCL) relationships for the particular PRS resource set.

9. The method of claim 8, wherein:

receiving one or more PRS activity reports comprises receiving periodic PRS activity reports from the positioning node; and each periodic PRS activity report is based on updated UE measurements received by the positioning node before sending the periodic PRS activity report.

10. The method of claim 9, wherein one or more of the following applies:

receiving the periodic PRS activity reports is responsive to one of the following:

a single request from the RAN node for PRS activity reports; or a configuration by an operations/administration/maintenance (OAM) function associated with the RAN; and only a particular number of periodic PRS activity reports are received, wherein the particular number is based on one of the following:

a predetermined or configured number; or a period of the periodic PRS activity reports and a predetermined or configured reporting duration.

11. The method of claim 9, further comprising sending, to the positioning node, an action report indicating the updated PRS transmission configurations for the associated TRPs.

12. The method of claim 11, wherein determining updated PRS transmission configurations comprises:

determining whether to deactivate any of the PRS corresponding to the measurements;

determining whether to activate transmission of other PRS by the associated TRPs; and activating or deactivating PRS transmissions by the associated TRPs, in accordance with the determinations.

13. The method of claim 11, wherein each of the updated PRS transmission configurations indicates one or more PRS that has been activated or deactivated responsive to the one or more received PRS activity reports.

14. The method of claim 8, wherein:

the method further comprises receiving, from the positioning node in response to the action report, positioning assistance data for broadcast in a cell served by the RAN node; and the positioning assistance data includes indications of active PRS transmissions by one or more of the TRPs associated with the RAN node.

15. The method of claim 14, wherein the positioning assistance data includes an indication that the RAN node is capable of on-demand activation of PRS in the cell.

16. The method of claim 8, wherein each PRS activity report includes a list of PRS resource sets that can be configured by the RAN node or TRPs associated with the RAN node.

17. The method of claim 8, wherein the information included in the PRS activity report is on beam-level or is aggregated to a resource set level.

18. A positioning node configured for operation external to but communicatively coupled with a radio access network (RAN), the positioning node comprising communication interface circuitry and processing circuitry that are operatively coupled and are configured to:

receive, from a plurality of user equipment (UEs), measurements made by the respective UEs on positioning reference signals (PRS) transmitted by a plurality of transmission reception points (TRPs), with each TRP being associated with one of a plurality of RAN nodes; and send, to the plurality of RAN nodes, respective PRS activity reports that include information about measurements made by the UEs on PRS transmitted by TRPs associated with the respective RAN nodes, wherein each PRS activity report also includes one or more of the following sets of information associated with each particular one of the PRS resource sets in the list:

a first set of information including:

identifiers of PRS resources within the particular PRS resource set; and one or more of the following associated with each particular one of the PRS resources within the particular PRS resource set:

a number of UEs that have reported reference signal received power RSRP) above a threshold for the particular PRS resource, average reported RSRP for the particular PRS resource, average reported reference signal received quality (RSRQ) for the particular PRS resource, and any quasi-colocation (QCL) relationships for the particular PRS resource; and a second set of information including:

a number of UEs that have reported reference signal received power (RSRP) above a threshold for the particular PRS resource set, average reported RSRP for the particular PRS resource set, average reported reference signal received quality (RSRQ) for the particular PRS resource set, and any quasi-colocation (QCL) relationships for the particular PRS resource set.

19. A radio access network (RAN) node associated with one or more transmission reception points (TRPs), the RAN node comprising communication interface circuitry and processing circuitry that are operatively coupled and are configured to:

receive, from a positioning node associated with the RAN, one or more PRS activity reports that include information about measurements made by a plurality of user equipment, UEs, on positioning reference signals (PRS) transmitted by TRPs associated with the RAN node; and determine updated PRS transmission configurations for the associated TRPs based on the one or more received PRS activity reports, wherein each PRS activity report also includes one or more of the following sets of information associated with each particular one of the PRS resource sets in the list:

a first set of information including:

identifiers of PRS resources within the particular PRS resource set; and one or more of the following associated with each particular one of the PRS resources within the particular PRS resource set:

a number of UEs that have reported reference signal received power (RSRP) above a threshold for the particular PRS resource, average reported RSRP for the particular PRS resource, average reported reference signal received quality (RSRQ) for the particular PRS resource, and any quasi-colocation (QCL) relationships for the particular PRS resource; and a second set of information including:

a number of UEs that have reported reference signal received power (RSRP) above a threshold for the particular PRS resource set, average reported RSRP for the particular PRS resource set, average reported reference signal received quality (RSRQ) for the particular PRS resource set, and any quasi-colocation (QCL) relationships for the particular PRS resource set.

* * * * *